(12) United States Patent
Chiu et al.

(10) Patent No.: US 10,557,558 B2
(45) Date of Patent: Feb. 11, 2020

(54) TOUCH FAUCET

(71) Applicant: Globe Union Industrial Corp., Taichung (TW)

(72) Inventors: Huiling Chiu, Taichung (TW); Chiahua Yuan, Taichung (TW); Yiping Lin, Taichung (TW)

(73) Assignee: Globe Union Industrial Corp., Taichung (TW)

( * ) Notice: Subject to any disclaimer, the term of this patent is extended or adjusted under 35 U.S.C. 154(b) by 7 days.

(21) Appl. No.: 16/053,890

(22) Filed: Aug. 3, 2018

(65) Prior Publication Data

US 2018/0340623 A1 Nov. 29, 2018

Related U.S. Application Data

(62) Division of application No. 15/185,100, filed on Jun. 17, 2016, now Pat. No. 10,274,096.

(30) Foreign Application Priority Data

Aug. 25, 2015 (TW) .............................. 104127755 A

(51) Int. Cl.
| | | |
|---|---|---|
| *F16K 21/06* | (2006.01) | |
| *E03C 1/04* | (2006.01) | |
| *F16K 11/074* | (2006.01) | |
| *F16K 11/076* | (2006.01) | |
| *F16K 11/00* | (2006.01) | |
| *E03C 1/02* | (2006.01) | |

(52) U.S. Cl.
CPC ................ *F16K 21/06* (2013.01); *E03C 1/04* (2013.01); *F16K 11/074* (2013.01); *F16K 11/076* (2013.01); *F16K 19/006* (2013.01); *E03C 2001/026* (2013.01); *E03C 2001/0415* (2013.01)

(58) Field of Classification Search
CPC ...... F16K 21/06; F16K 11/074; F16K 11/076; F16K 19/006; E03C 1/04; E03C 2001/0415; E03C 2001/026
See application file for complete search history.

(56) References Cited

FOREIGN PATENT DOCUMENTS

| TW | I226578 B | 3/2005 |
|---|---|---|
| TW | M382408 U | 6/2010 |
| TW | M432670 | 7/2012 |
| TW | I369459 B | 8/2012 |
| TW | M452280 U | 5/2013 |

*Primary Examiner* — Marina A Tietjen
*Assistant Examiner* — Frederick D Soski
(74) *Attorney, Agent, or Firm* — Alan D. Kamrath; Karin L. Williams; Mayer & Williams PC

(57) ABSTRACT

A touch faucet contains: a body, a temperature control valve, a water control valve, and an actuation member. The body includes an inlet segment, an outlet segment, and a first cavity which has a first hole. The temperature control valve is housed in the first cavity and includes a water inflow portion configured to flow cold water and hot water, a mixing chamber in which the cold water and the hot water are mixed to form a mixing water, and a water outflow portion configured to flow the mix water. The water control valve includes an operation post touched to turn on the water control valve, such that the mixing water flows into the water outflow portion from the mixing chamber, and the actuation member partially exposes outside the body so as to be operated by a user to drive the operation post to move.

7 Claims, 34 Drawing Sheets

TOUCH FAUCET

CROSS REFERENCE TO RELATED APPLICATIONS

The present application is a divisional application of U.S. patent application Ser. No. 15/185,100, entitled "Touch faucet" fled on Jun. 17 2016, which is incorporated herein by reference.

FIELD OF THE INVENTION

The present invention relates to a faucet, and more particularly to a touch faucet.

DESCRIPTION OF THE PRIOR ART

A conventional control valve for a spray head of a faucet is manufactured at high cost and is complicated. Accordingly, improved touch control valves were disclosed in TW Patent Nos. M432670, 1228578, 1369459, M452280 and M382408, respectively. The improved touch control valves are an automatic valve or a manual valve, wherein when the touch control valves are the manual valve, water supply is stopped by touching an actuation element, after starting the water supply. When the touch control valves are the automatic valve, the water supply is stopped automatically by way of water pressure change after a period of using time.

In addition, one touch control valves are sold by many companies, such as 3M, wherein each one touch control valve is fixed on an outlet of the faucet and the water supply is started or stopped by manually touching an actuation element in the control valve, thus causing contamination to the actuation element.

A conventional faucet contains a handle and a central shaft driven by the handle so as to control water supply or to adjust temperature of the water supply. But an operation travel is too long to operate the faucet smoothly and to obtain aesthetics appearance of the control valve.

A conventional pull-out or non pull-out faucet contains an infrared sensor for sensing user's hand, yet the pull-out or non pull-out faucet cannot be controlled as the infrared sensor or a circuit board is broken.

The present invention has arisen to mitigate and/or obviate the afore-described disadvantages.

SUMMARY OF THE INVENTION

The primary objective of the present invention is to provide a touch faucet which is capable of overcoming the shortcomings of the conventional touch faucet.

To obtain the above objective, a touch faucet provided by the present invention contains: a body, a temperature control valve, a water control valve, and an actuation member.

The body includes an inlet segment, an outlet segment, and a first cavity defined between the inlet segment and the outlet segment; wherein the first cavity has a first hole.

The temperature control valve is housed in the first cavity of the body, and the temperature control valve includes a water inflow portion configured to flow cold water and hot water, a mixing chamber in which the cold water and the hot water are mixed together at a predetermined ratio so as to form a mixing water, and a water outflow portion configured to flow the mix water; wherein the water outflow portion is in communication with the outlet segment of the body so that the mixing water flows out of the outlet segment.

The water control valve is fixed between the mixing chamber and the water outflow portion of the temperature control valve, and the water control valve includes an operation post extending outwardly therefrom and touched to turn on the water control valve, such that the mixing water flows into the water outflow portion from the mixing chamber.

The actuation member partially exposes outside the body so as to be operated by a user to drive the operation post of the water control valve to move.

Accordingly, the water control valve is capable of saving and stopping the water supply automatically. For example, when the operation post is driven to move, the water supply of the touch faucet is started for a period of time, and after the operation post automatically moves back to the original position, the water supply is stopped.

When the water control valve cannot stop the water supply, the actuation member is pressed so that the water control valve stops the water supply.

Preferably, the actuation member cooperates with the returning device so as to return back to the original positions automatically.

The actuation member is pressed to drive the operation post of the water control valve to stop the water supply easily.

The actuation member drives the water control valve so as to avoid the water control valve being touched by user's hand, thus preventing contamination of the water control valve.

The touch faucet is a pull-out faucet or a non pull-out faucet fixed in the bathroom or the kitchen so as to satisfy using requirements.

The touch faucet is capable of saving the water supply and adjusting water temperature by way of the water control valve and the temperature control valve.

DETAILED DESCRIPTION OF THE PREFERRED EMBODIMENTS

Figure 1:
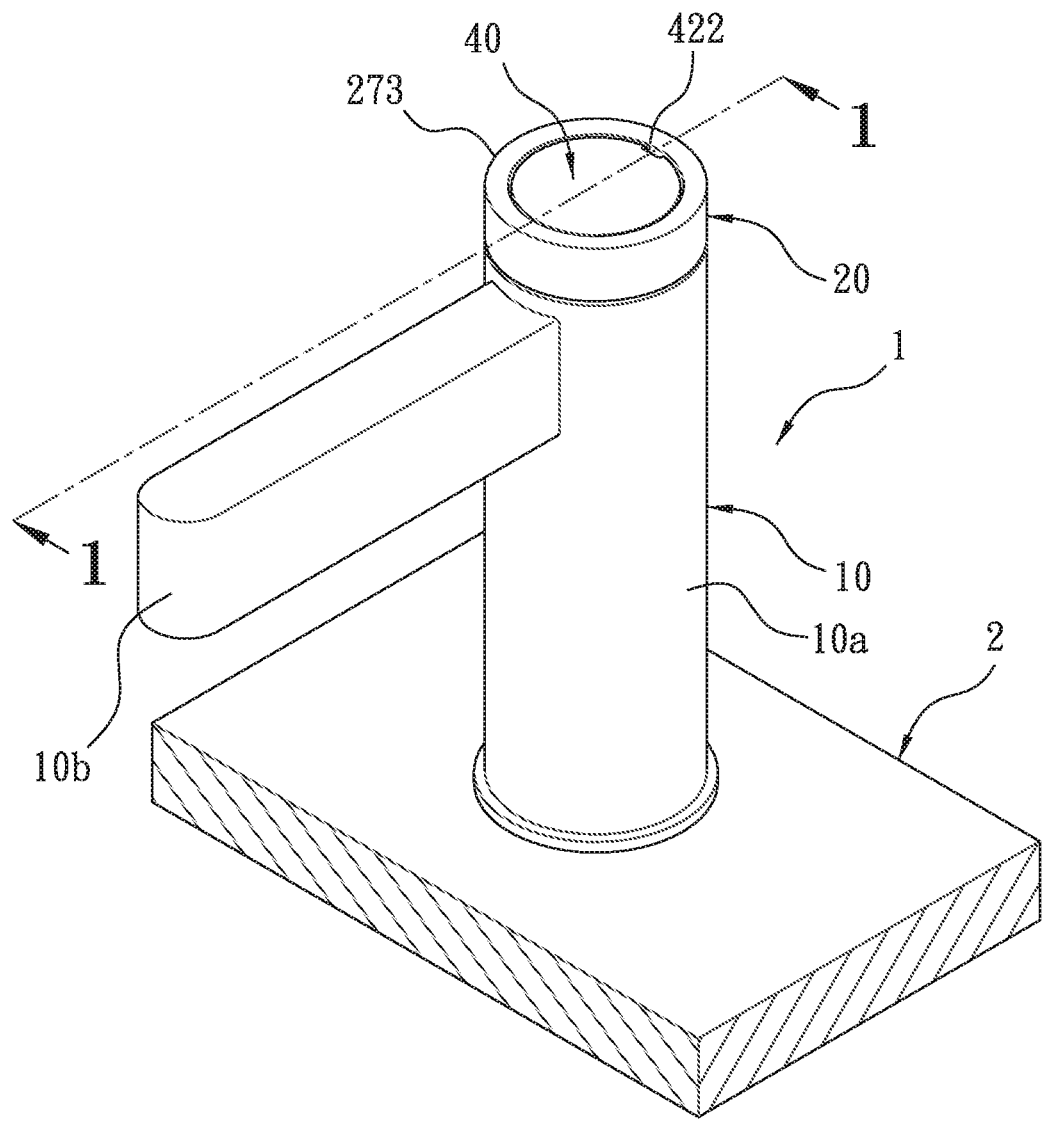
FIG. 1 is a perspective view showing the application of a touch faucet according to a first embodiment of the present invention.
Figure 2:
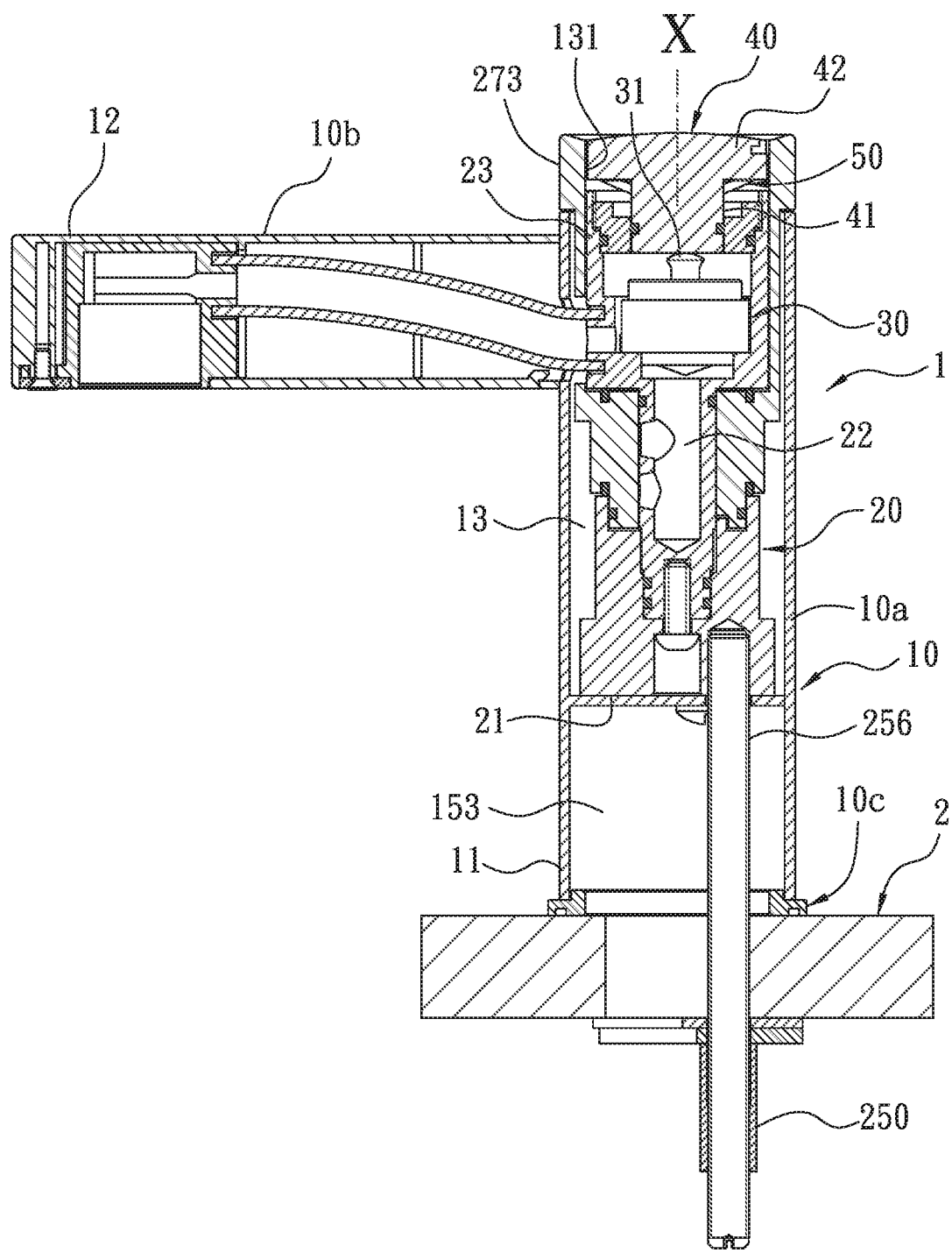
FIG. 2 is a cross sectional view taken along the line 1-1 of FIG. 2.
Figure 3:
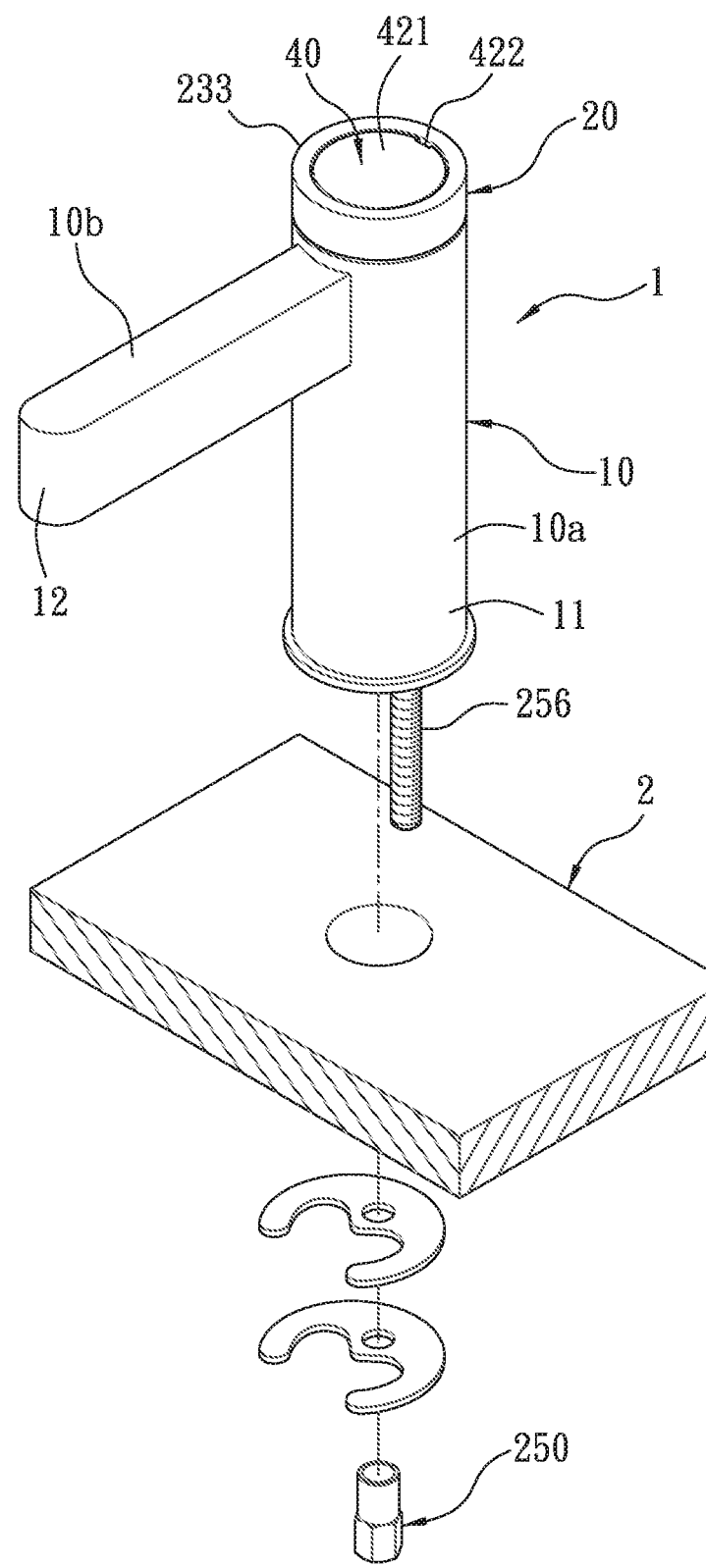
FIG. 3 is a perspective view showing the exploded components of a part of the touch faucet according to the first embodiment of the present invention.

With reference to FIGS. 1-3, a touch faucet 1 according to a first embodiment of the present invention is mounted on a basin or a fixing wall 2 in a bathroom and includes a body 10, a temperature control valve 20, a water control valve 30, and an actuation member 40.

Figure 4:
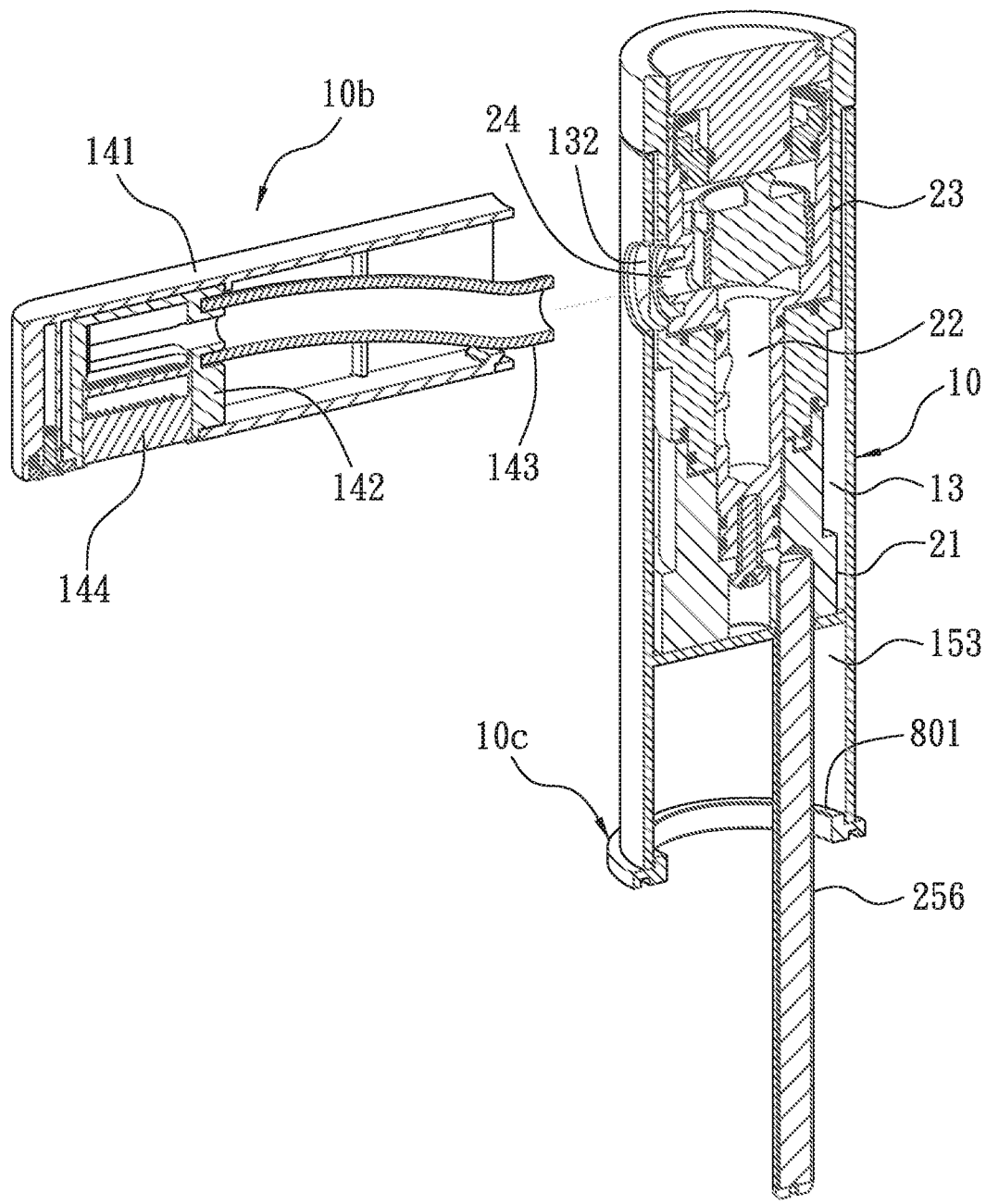
FIG. 4 is a cross-sectional perspective view showing the exploded components of a part of the touch faucet according to the first embodiment of the present invention.
Figure 5:
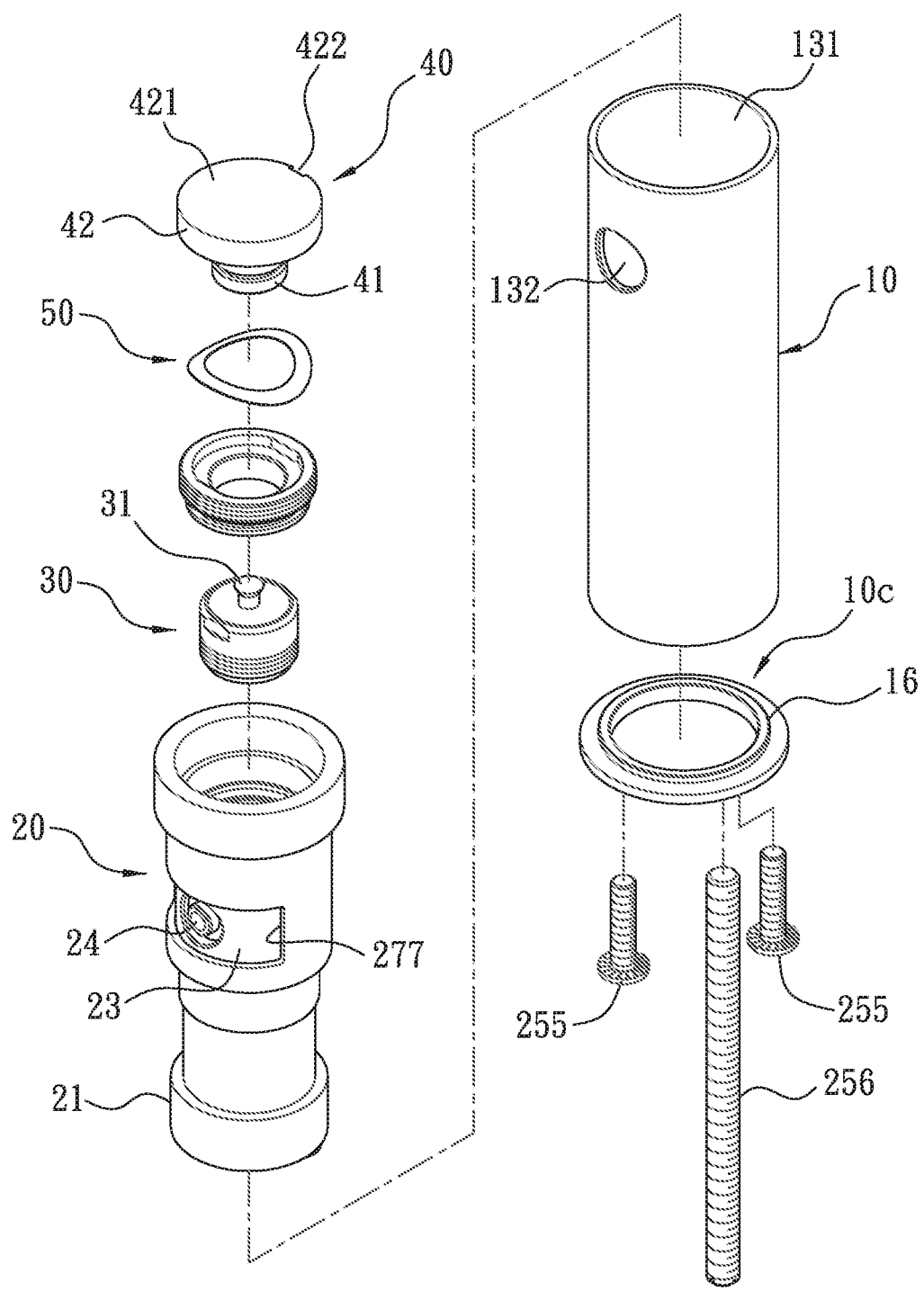
FIG. 5 is another perspective view showing the exploded components of a part of the touch faucet according to the first embodiment of the present invention.

Referring to FIGS. 4 and 5, the body 10 includes an inlet segment 11, an outlet segment 12, and a first cavity 13 defined between the inlet segment 11 and the outlet segment 12, wherein the first cavity 13 has a first hole 131 formed on a top thereof.

The temperature control valve 20 is housed in the first cavity 13 from the first hole 131 of the body 10, and the temperature control valve 20 includes a water inflow portion 21 configured to flow cold water and hot water, a mixing chamber 22 in which the cold water and the hot water are mixed together at a predetermined ratio so as to form a mixing water, and a water outflow portion 23 configured to flow the mix water, wherein the water outflow portion 23 is in communication with the outlet segment 12 of the body 10 so that the mixing water flows out of the outlet segment 12.

The water control valve 30 is fixed between the mixing chamber 22 and the water outflow portion 23 of the temperature control valve 20, and the water control valve 30 includes an operation post 31 extending outwardly therefrom and touched to turn on the water control valve 30, such that the mixing water flows into the water outflow portion 23 from the mixing chamber 22.

The actuation member 40 partially exposes outside the body 10 so as to be operated by a user to drive the operation post 31 to move.

The actuation member 40 includes a driving portion 41 inserted into the water outflow portion 23 of the temperature control valve 20, wherein the actuation member 40 is pressed to move along an axial line X of the water outflow portion 23 so that the driving portion 41 drives the operation post 31 of the water control valve 30 to move.

Figure 13:
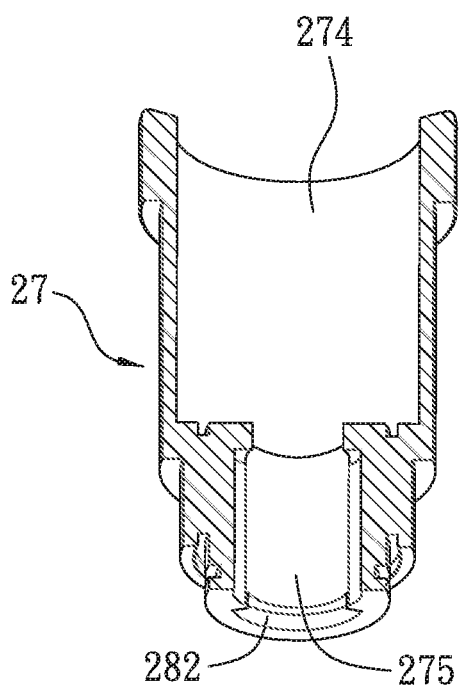
FIG. 13 is a cross-sectional perspective view taken along the line 5-5 of FIG. 11.
Figure 14:
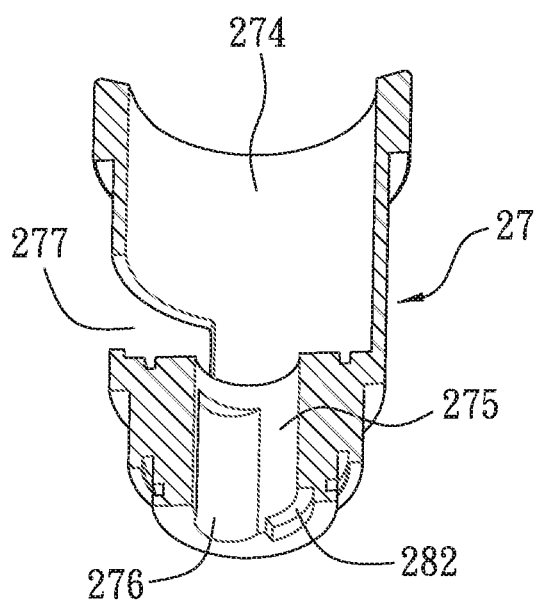
FIG. 14 is a cross-sectional perspective view taken along the line 6-6 of FIG. 11.

The touch faucet 1 further comprises a returning device 50 configured to return the actuation member 40 back to an original position after not pressing the actuation member 40, wherein the returning device 50 is a resilient element, such as a disc spring, which is defined between the actuation member 40 and the water outflow portion 23, as illustrated in FIG. 13.

Alternatively, the returning device 50 includes a first magnetic attraction element and a second magnetic attraction element which are defined between the actuation member 40 and the water outflow portion 23, such that when the actuation member 40 is pressed to move, the first magnetic attraction element and the second magnetic attraction element move to each other, thus producing magnetic repulsion.

Referring to FIG. 4, the body 10 includes a cylinder 10a and a water supply assembly 10b, wherein the cylinder 10a has the inlet segment 11 and the first cavity 13; the water supply assembly 10b has the outlet segment 12 communicating with the water outflow portion 23 of the temperature control valve 20 via the cylinder 10a, such that the mixing water flows into the outlet segment 12 from the water outflow portion 23.

The water supply assembly 10b has a casing 141 secured on an outer wall of the cylinder 10a, a holder 142 accommodated in the casing 141 adjacent to the outlet segment 12, a first outlet tube 143 mounted between the holder 142 and the water outflow portion 23, and an aerator 144 fixed in the holder 142 so that the mixing water flows out of the aerator 144 from the water outflow portion 23 via the first outlet tube 143 and the holder 142.

As shown in FIGS. 4 and 5, the first cavity 13 of the body 10 has a second hole 132 defined on an inner wall of the first cavity 13 of the body 10. The water outflow portion 23 of the temperature control valve 20 has a vent 24 formed thereon opposite to the second hole 132, such that the first outlet tube 143 of the water supply assembly 10b communicates with the vent 24 through the second hole 132.

Figure 6:
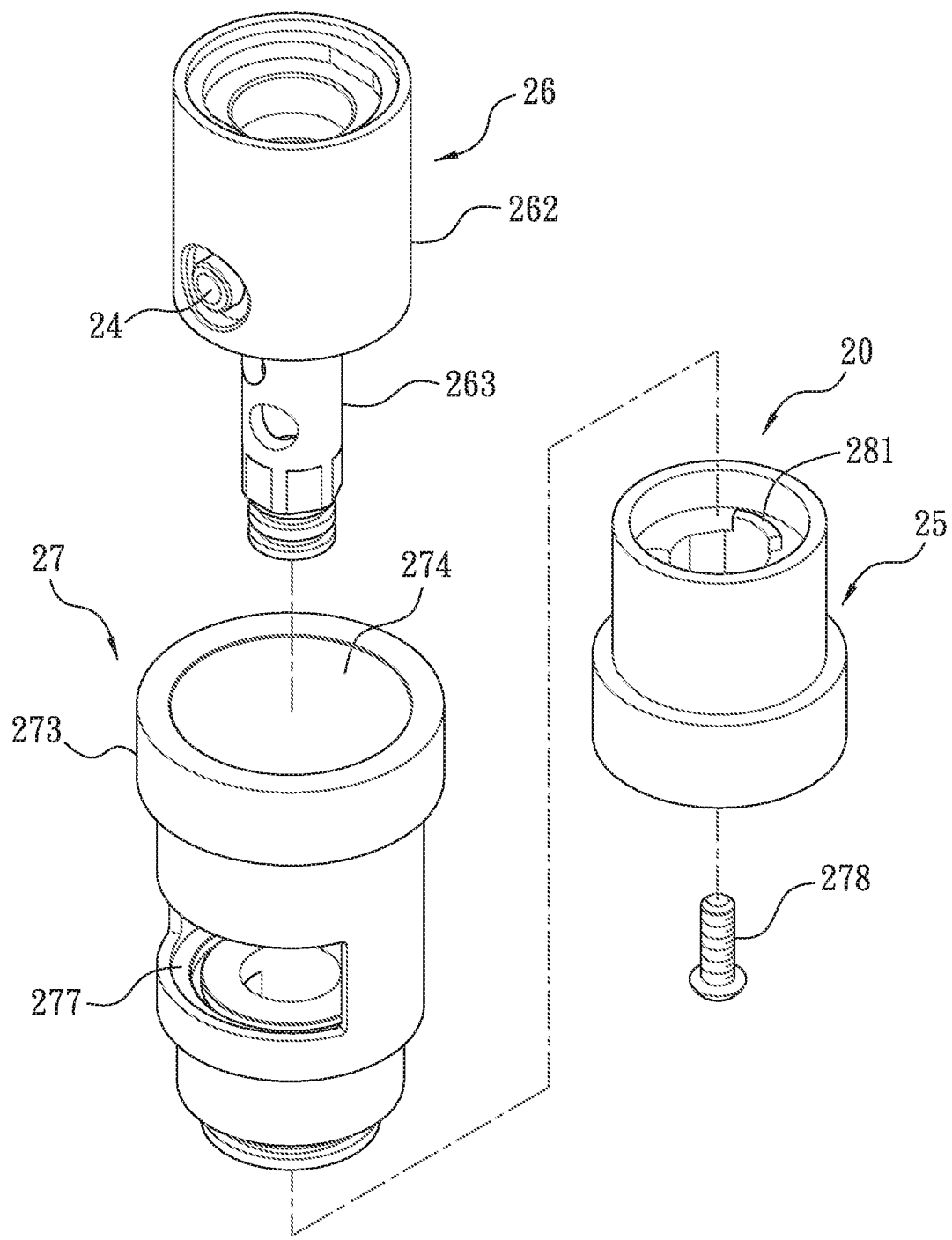
FIG. 6 is also another perspective view showing the exploded components of a part of the touch faucet according to the first embodiment of the present invention.
Figure 7:
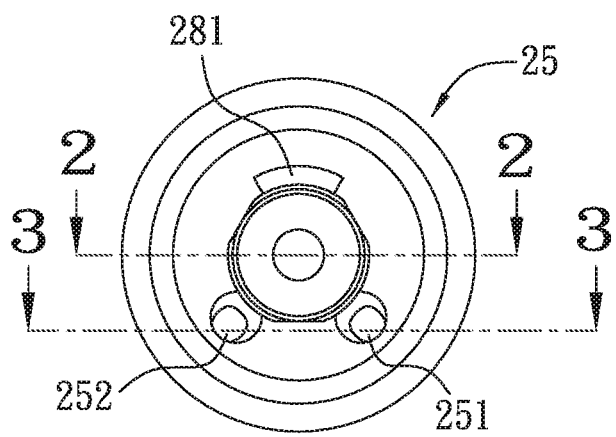
FIG. 7 is a side plane view showing the assembly of a part of the touch faucet according to the first embodiment of the present invention.
Figure 8:
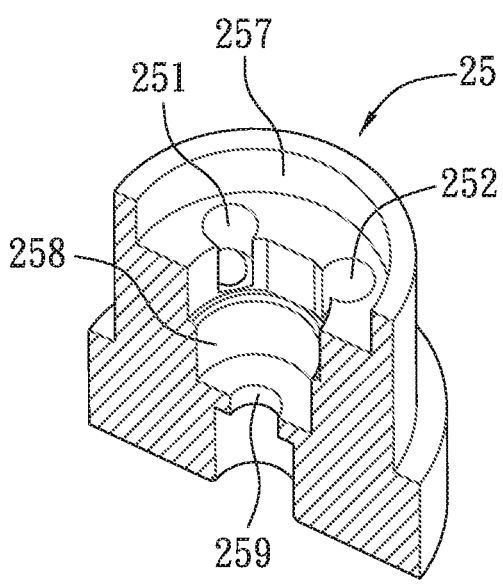
FIG. 8 is a cross-sectional perspective view taken along the line of 2-2 of FIG. 7.
Figure 9:
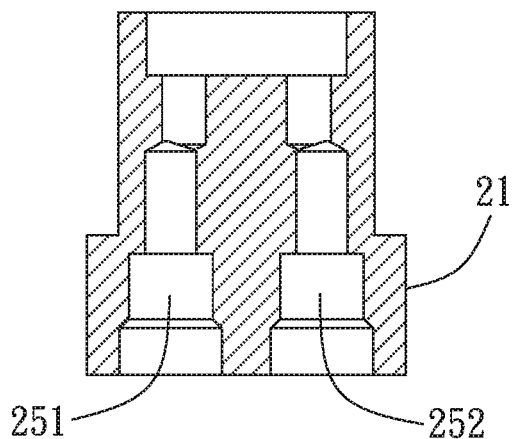
FIG. 9 is a cross sectional view taken along the line of 3-3 of FIG. 7.
Figure 10:
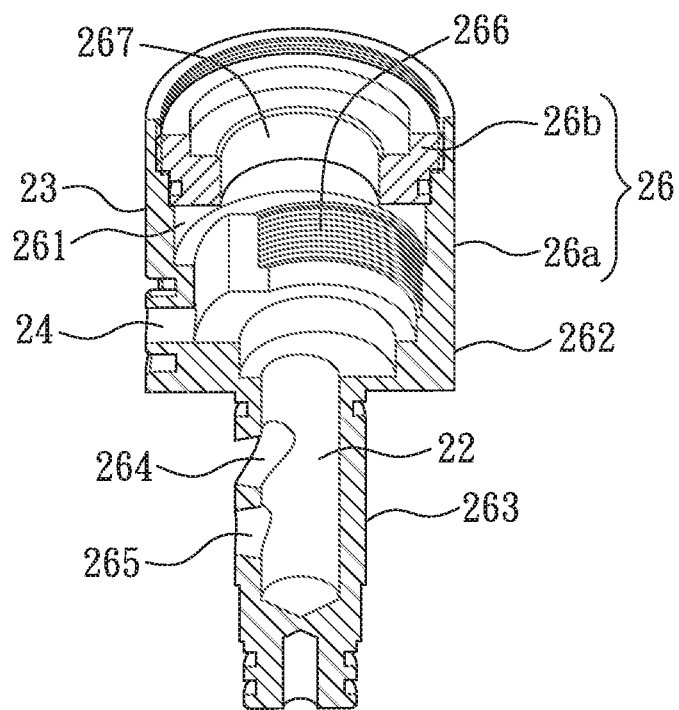
FIG. 10 is a cross-sectional perspective view showing the assembly of a part of the touch faucet according to the first embodiment of the present invention.
Figure 11:
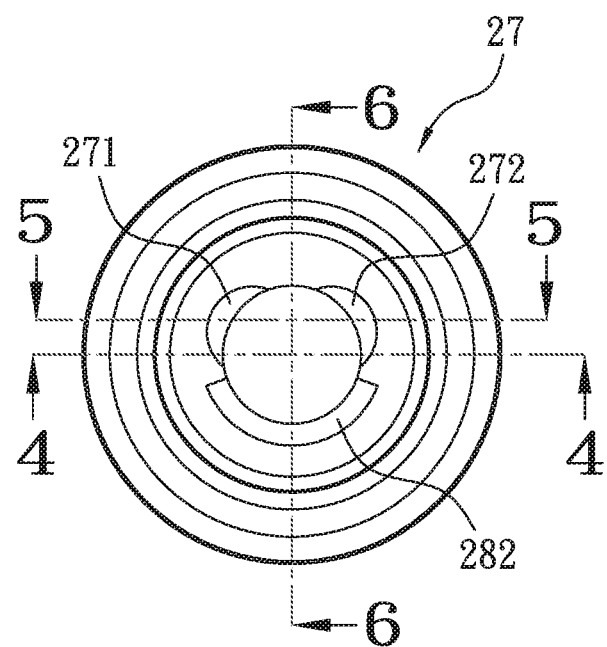
FIG. 11 is another side plane view showing the assembly of a part of the touch faucet according to the first embodiment of the present invention.
Figure 16:
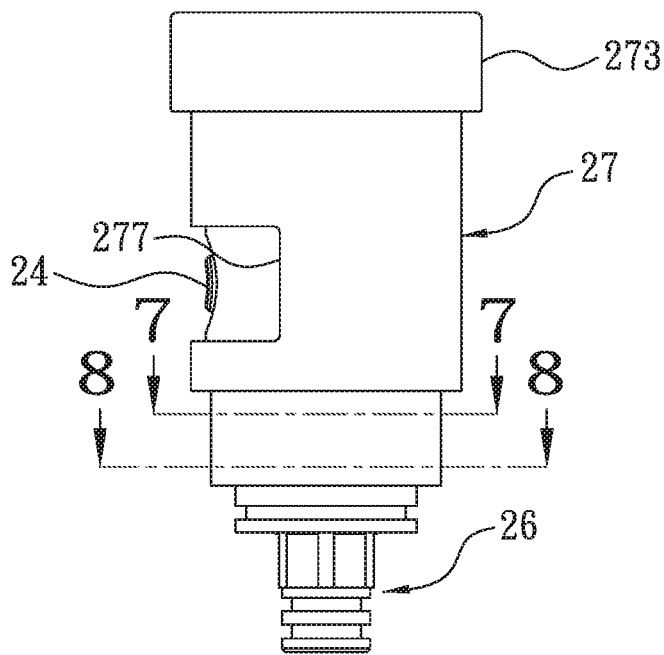
FIG. 16 is also another side plane view showing the assembly of a part of the touch faucet according to the first embodiment of the present invention.
Figure 17:
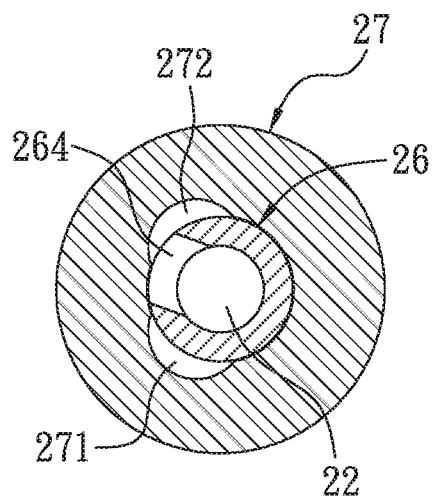
FIG. 17 is a cross sectional view taken along the line 7-7 of FIG. 16.
Figure 18:
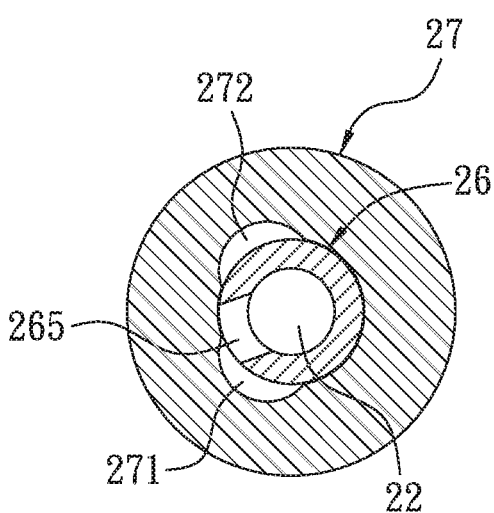
FIG. 18 is a cross sectional view taken along the line 8-8 of FIG. 16.
Figure 19:
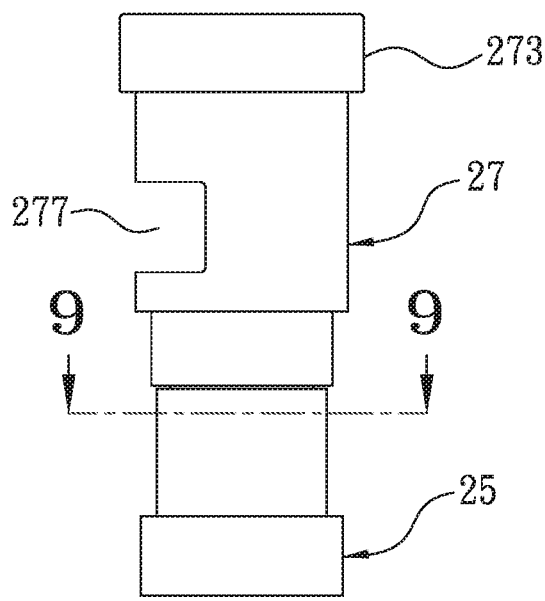
FIG. 19 is still another side plane view showing the assembly of a part of the touch faucet according to the first embodiment of the present invention.

With reference to FIG. 6, the temperature control valve 20 further includes:

a valve seat 25, as illustrated in FIGS. 7 to 9, housed in the first cavity 13 of the body 10, a first conduit 251 configured to flow the cold water, and a second conduit 252 configured to flow the hot water, hence the first conduit 251 and the second conduit 252 form the water inflow portion 21;

a valve core 26, as shown in FIG. 10, connecting with the valve seat 25 and having the mixing chamber 22 defined in the valve core 26, the valve core 26 also having a flowing channel 261 configured to flow the mixing water and communicating with the mixing chamber 22, wherein the flowing channel 261 is located at the water outflow portion 23; and an adjustment column 27, as shown in FIGS. 11 to 15, rotatably fitted with the valve core 26 within a rotatable range and limited between the valve core 26 and the valve seat 25. Between the adjustment column 27 and the valve core 26 are defined a cold-water passage 271 and a hot-water passage 272, as illustrated in FIGS. 16 to 18. When the adjustment column 27 is rotated, a communicating portion of the cold-water passage 271 and the first conduit 251 and a communicating portion of the hot-water passage 272 and the second conduit 252 are adjustable, as illustrated in FIGS. 19 and 20, so as to control a mixing ratio and a mixing temperature of the cold water and the hot water in the mixing chamber 22.

Figure 20:
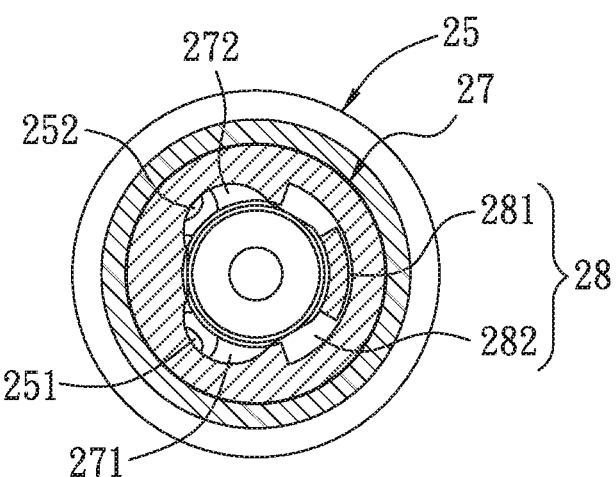
FIG. 20 is a cross sectional view taken along the line 9-9 of FIG. 19.

With reference to FIGS. 6, 7 and 20, between the valve seat 25 and the adjustment column 27 is defined a rotatable limitation structure 28 so as to rotate the adjustment column 27 relative to the valve seat 25 within the rotatable range. The rotatable limitation structure 28 includes a positioning protrusion 281 formed on a top of the valve seat 25 and includes an arcuate groove 282 defined on a bottom of the adjustment column 27 so as to limit a sliding of the positioning protrusion 281 in the arcuate groove 282.

Referring to FIG. 20, when the positioning protrusion 281 is located at an intermediate position of the arcuate groove 282, i.e., when the adjustment column 27 is rotated to the intermediate position, the cold-water passage 271 is in communication with the first conduit 251, and the hot-water passage 272 communicates with the second conduit 252.

Figure 21:
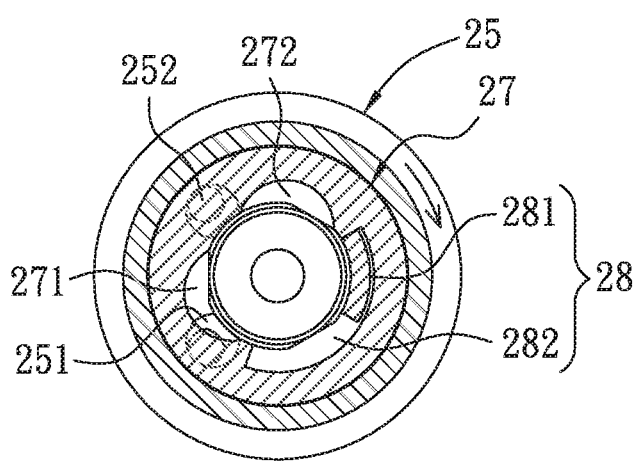
FIG. 21 is a cross sectional view showing the operation of a part of the touch faucet according to the first embodiment of the present invention.

As illustrated in FIG. 21, when the adjustment column 27 is rotated 40 degrees in a clockwise direction, the second conduit 252 is closed by the bottom of the adjustment column 27, so only the first conduit 251 is in communication with the cold-water passage 271, thus flowing the cold water to the mixing chamber 22.

Figure 22:
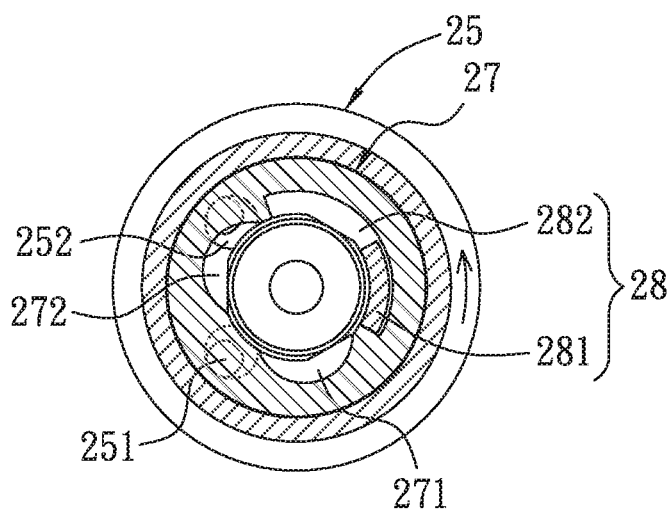
FIG. 22 is another cross sectional view showing the operation of a part of the touch faucet according to the first embodiment of the present invention.

As shown in FIG. 22, when the adjustment column 27 is rotated 40 degrees in a counterclockwise direction, the first conduit 251 is closed by the bottom of the adjustment column 27 and is not in communication with the cold-water passage 271, and the second conduit 252 communicates with the hot-water passage 272, thus flowing the hot water to the mixing chamber 22.

As illustrated in FIGS. 6 and 10, the valve core 26 has a cylindrical portion 262 and a tubular portion 263 extending outwardly from a bottom of the cylindrical portion 262. The cylindrical portion 262 forms the water outflow portion 23, the flowing channel 261, and the vent 24. The tubular portion 263 has the mixing chamber 22 defined therein and connects with the valve seat 25.

Figure 12:
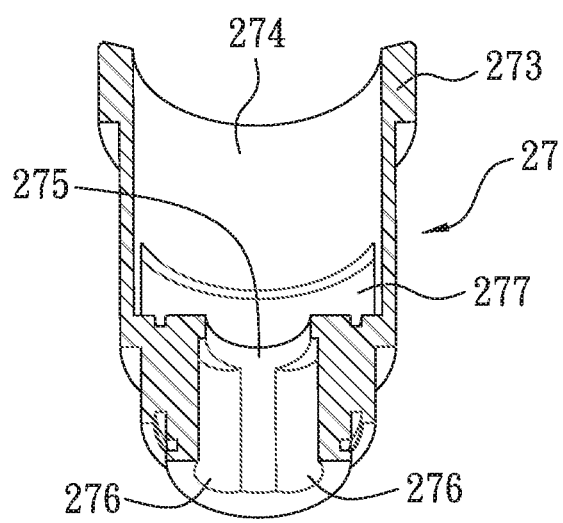
FIG. 12 is a cross-sectional perspective view taken along the line 4-4 of FIG. 11.

With reference to FIGS. 2, 6 and 12, the adjustment column 27 has a circular rib 273 extending out of the first hole 131 of the body 10 so that the user operates the adjustment column 27 by way of the circular rib 273, and the adjustment column 27 also has a housing trench 274 defined in a top thereof so as to accommodate the cylindrical portion 262 of the valve core 26 and the actuation member 40. The housing trench 274 has a first orifice 275 passing through a bottom thereof so as to fit with the tubular portion 263 and has two troughs 276 formed under the first orifice 275. The cold-water passage 271 and the hot-water passage 272 are defined by the first orifice 275, the two troughs 276, and the tubular portion 263. The housing trench 274 of the adjustment column 27 further has a second orifice 277 passing through an inner wall thereof with respect to the vent 24 of the valve core 26 so that the first outlet tube 143 of the water supply assembly 10b communicates with the vent 24 through the second orifice 277.

Referring to FIGS. 10, 17 and 18, the tubular portion 263 of the valve core 26 has a first tilted aperture 264 and a second tilted aperture 265 which are in communication with the mixing chamber 22, such that when the adjustment column 27 is rotated as shown in FIG. 20, the first tilted aperture 264 communicates with the hot-water passage 272, as illustrated in FIG. 17, and the second tilted aperture 265 communicates with the cold-water passage 271, as illustrated in FIG. 18, hence the cold water from the first conduit 251 and the hot water from the second conduit 252 evenly mix in the mixing chamber 22 via the cold-water passage 271 and the hot-water passage 272.

Figure 23:
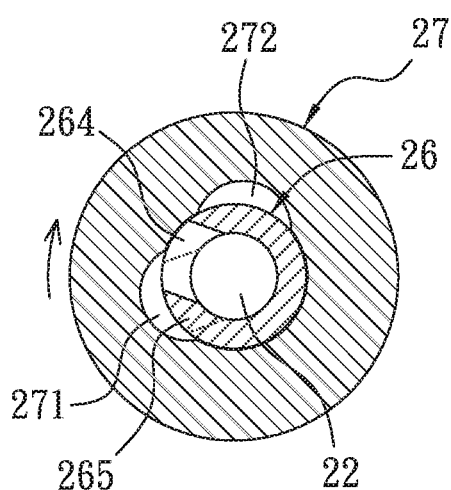
FIG. 23 is also another cross sectional view showing the operation of a part of the touch faucet according to the first embodiment of the present invention.

As shown in FIG. 23, when the adjustment column 27 is rotated to a predetermined angle of FIG. 21, the first tilted aperture 264 and the second tilted aperture 265 communicate with the cold-water passage 271 so that the cold water from the first conduit 251 flows into the mixing chamber 22, thus flowing the cold water out of the touch faucet 1. In the meantime, the hot-water passage 272 does not communicate with the second conduit 252.

Figure 24:
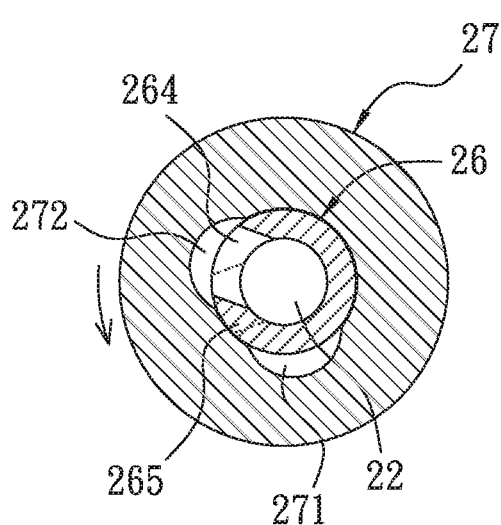
FIG. 24 is still another cross sectional view showing the operation of a part of the touch faucet according to the first embodiment of the present invention.

With reference to FIG. 24, when the adjustment column 27 is rotated a predetermined angle of FIG. 22, the first tilted aperture 264 and the second tilted aperture 265 communicate with the hot-water passage 272 so that the hot water from the second conduit 252 flows into the mixing chamber 22, thus flowing the hot water out of the touch faucet 1. In the meantime, the cold-water passage 271 does not communicate with the first conduit 251.

Figure 15:
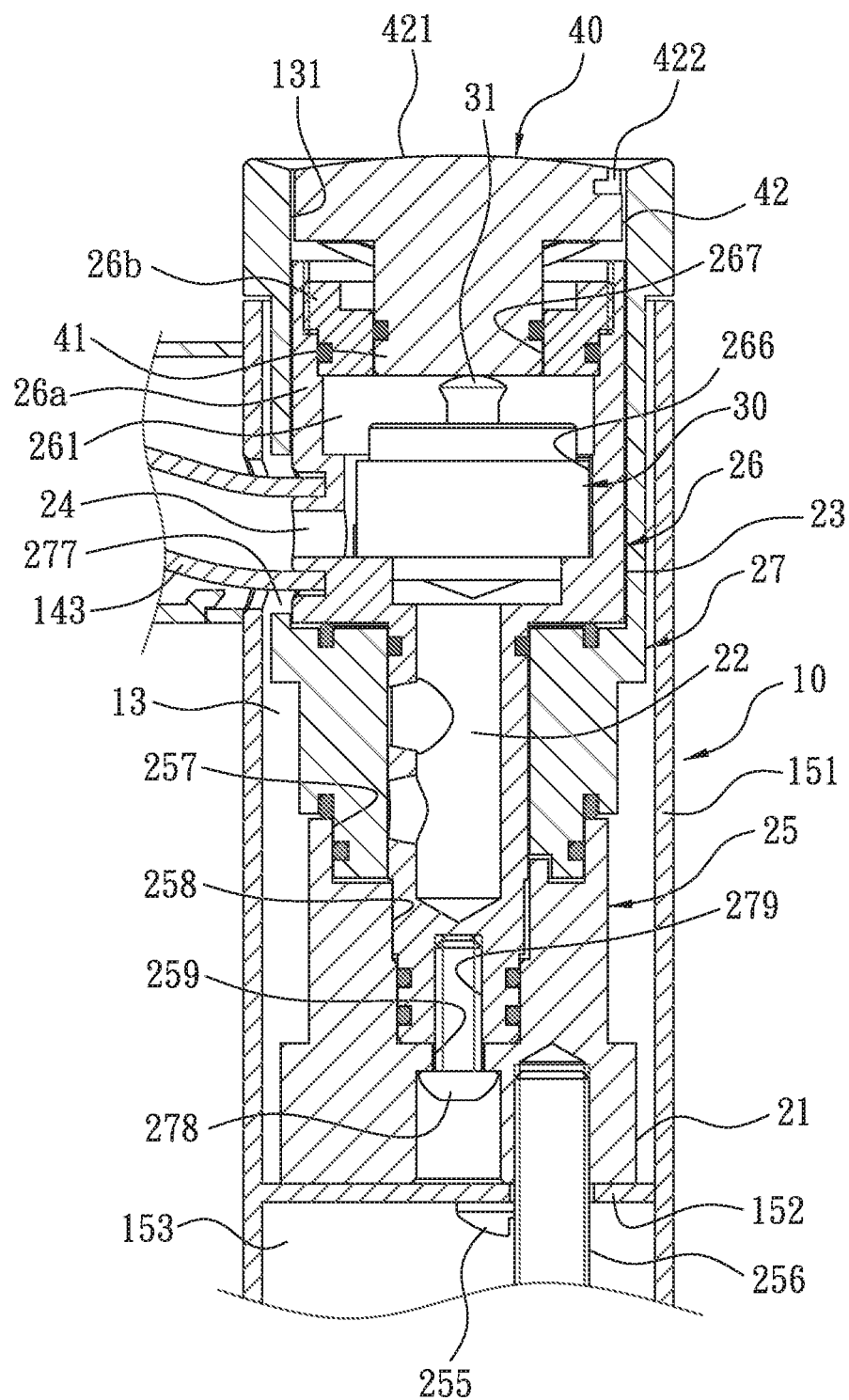
FIG. 15 is an amplified cross-sectional view of FIG. 2.
Figure 25:
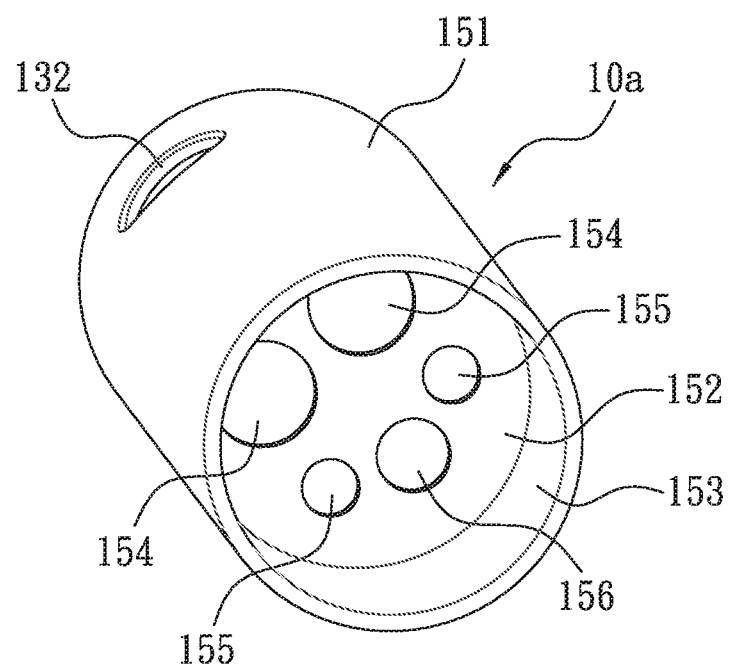
FIG. 25 is a perspective view showing the assembly of a part of the touch faucet according to the first embodiment of the present invention.

Referring to FIGS. 15 and 25, the cylinder 10a has a peripheral fence 151 and a support fence 152 connecting with an inner surface of the peripheral fence 151, and the support fence 152 separates the first cavity 13 from a second cavity 153 in the peripheral fence 151. The support fence 152 further has two third holes 154, two fourth holes 155, and a fifth hole 156, wherein the two third holes 154 respectively accommodate a cold-water supply pipe and a hot-water supply pipe which are connected with the first conduit 251 and the second conduit 252, individually, as shown in FIG. 26.

Figure 26:
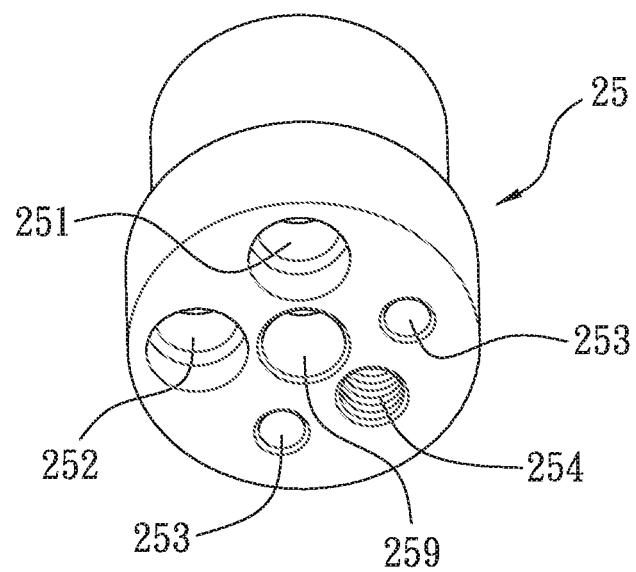
FIG. 26 is another perspective view showing the assembly of a part of the touch faucet according to the first embodiment of the present invention.

As illustrated in FIGS. 15 and 26, the valve seat 25 includes two first threaded orifices 253 and a second threaded orifice 254 which are formed on a bottom of the valve seat 25, and each of two first screw bolts 255 inserts through each of the two fourth holes 155 of the cylinder 10a so as to screw with each of the two first threaded orifices 253, hence the valve seat 25 is fixed on the cylinder 10a.

Furthermore, a screw rod 256 inserts through the fifth hole 156 of the support fence 152 so as to screw with the second threaded orifice 254 and to lock with a screwing element 250, as illustrated in FIG. 2, such that the valve seat 25 and the cylinder 10a are mounted on the fixing wall 2.

Referring to FIGS. 2, 4 and 5, the body 10 further includes a fitting mount 10c arranged on a bottom thereof and abutting with the fixing wall 2, and the body 10 includes a circular locking shoulder 16 configured to retain with the second cavity 153 below the cylinder 10a.

As shown in FIGS. 8 and 15, the valve seat 25 further has a first connecting slot 257 defined on the top thereof so as to retain with the bottom of the adjustment column 27, and the valve seat 25 further has a second connecting slot 258 arranged on the bottom thereof so as to retain with a bottom of the valve core 26. The valve seat 25 further includes a central orifice 259 communicating with the second connecting slot 258 so that a second screw bolt 278 inserts through the central orifice 259 to screw with a third threaded orifice 279, thus fixing the valve core 26 on the valve seat 25.

Referring to FIGS. 10 and 15, the flowing channel 261 of the valve core 26 has a threaded connection portion 266 configured to screw with the water control valve 30. In addition, the valve core 26 has a coupling part 26a and a covering part 26b. The coupling part 26a is configured to form a main portion of the valve core 26. The covering part 26b is screwed with a top of the coupling part 26a so as to form a top of the flowing channel 261, and the covering part 26b has an axial aperture 267 for accommodating the driving portion 41 of the actuation member 40.

As shown in FIGS. 5 and 15, the actuation member 40 has a forced portion 42 and the driving portion 41 extending outwardly from a bottom of the forced portion 42; and the forced portion 42 has a pressing face 421 defined on a top thereof so as to be pressed; wherein as the pressing face 421 is not pressed, it flushes with the top of the body 10. Preferably, the actuation member 40 further includes a cutout 422 formed on a peripheral side thereof, as illustrated in FIG. 1 so that the user removes the actuation member 40 by using a tool.

Figure 27:
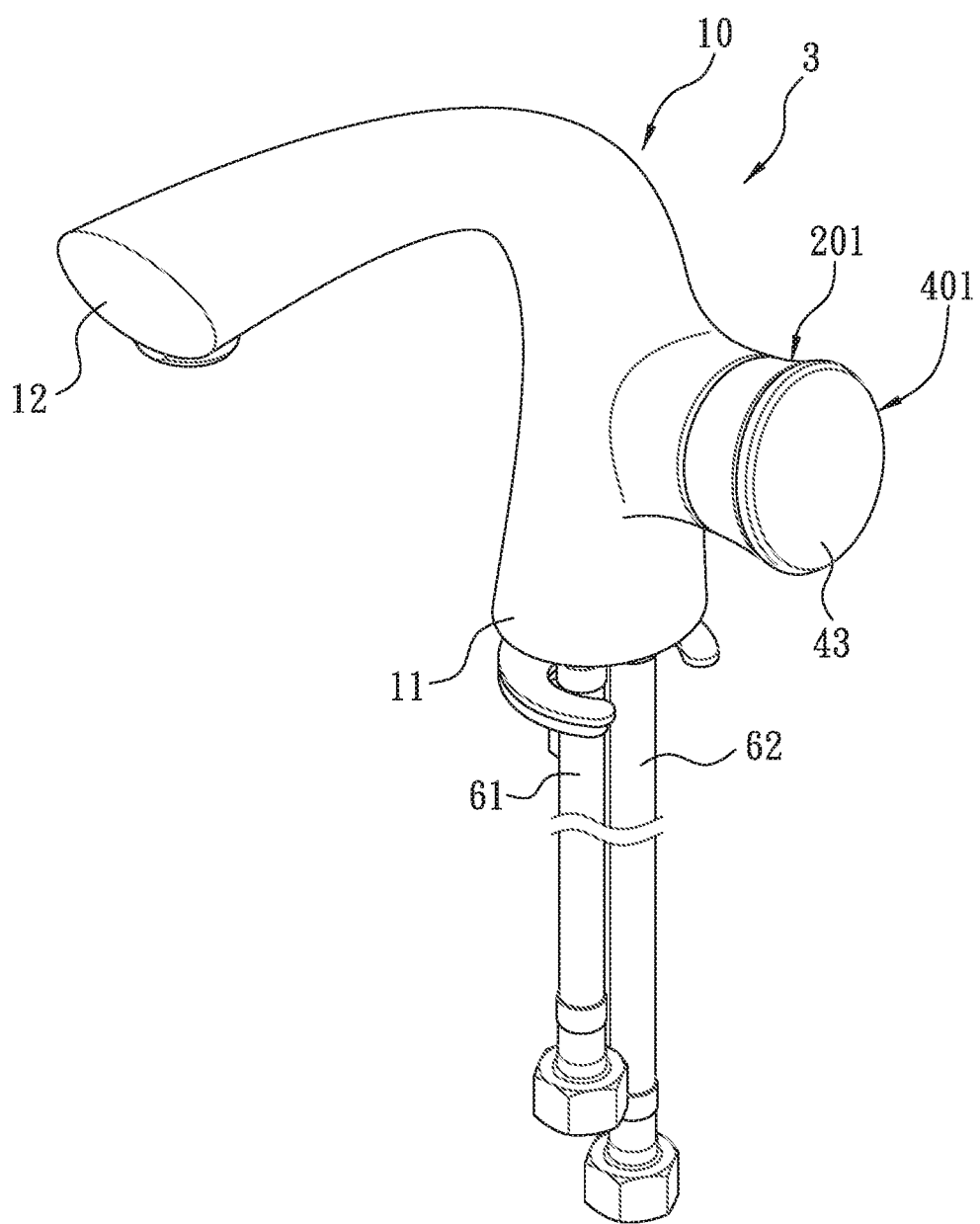
FIG. 27 is a perspective view showing the assembly of a touch faucet according to a second embodiment of the present invention.
Figure 28:
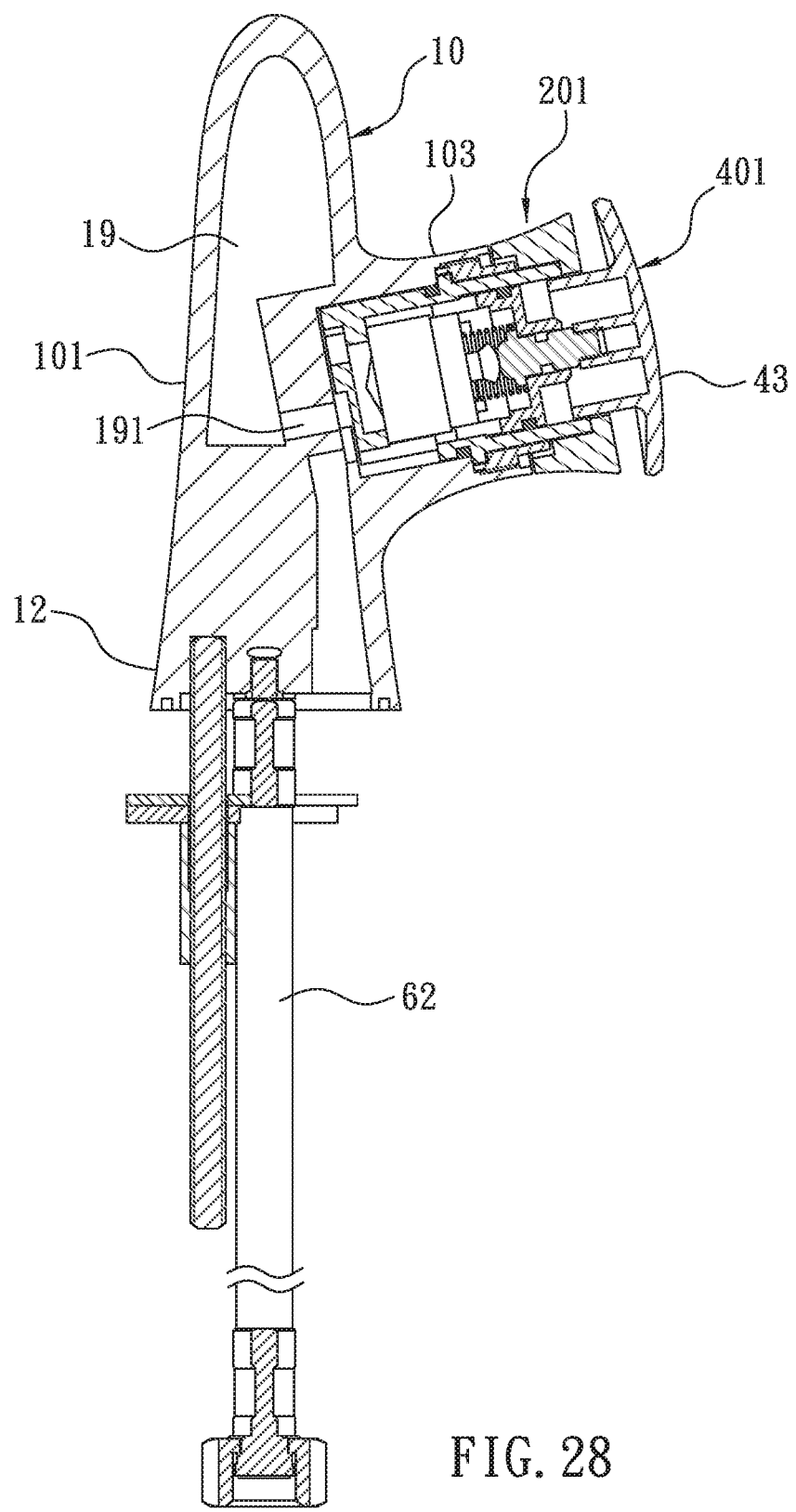
FIG. 28 is a cross sectional view showing the assembly of the touch faucet according to the second embodiment of the present invention.
Figure 29:
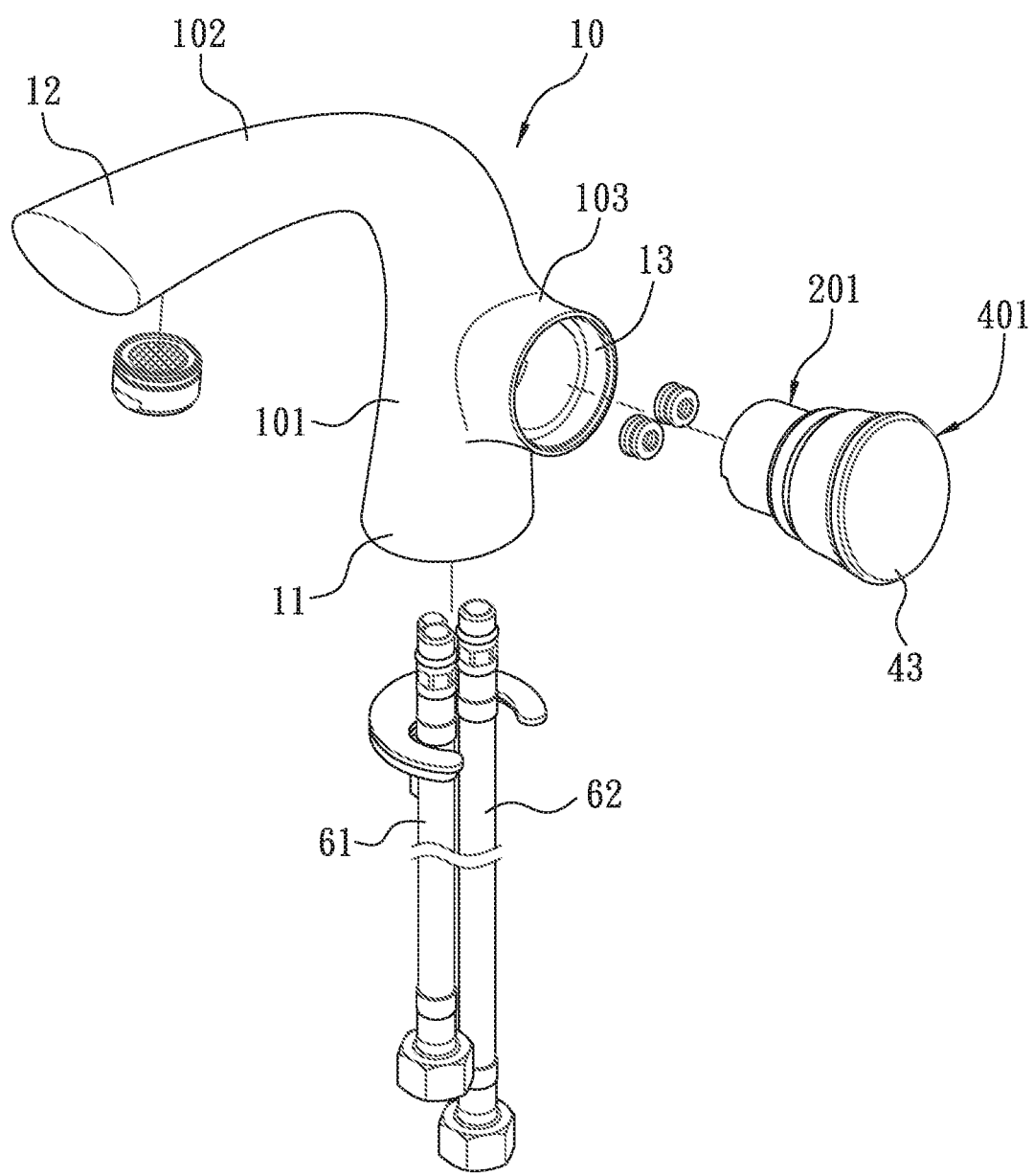
FIG. 29 is a perspective view showing the exploded components of a part of the touch faucet according to the second embodiment of the present invention.
Figure 30:
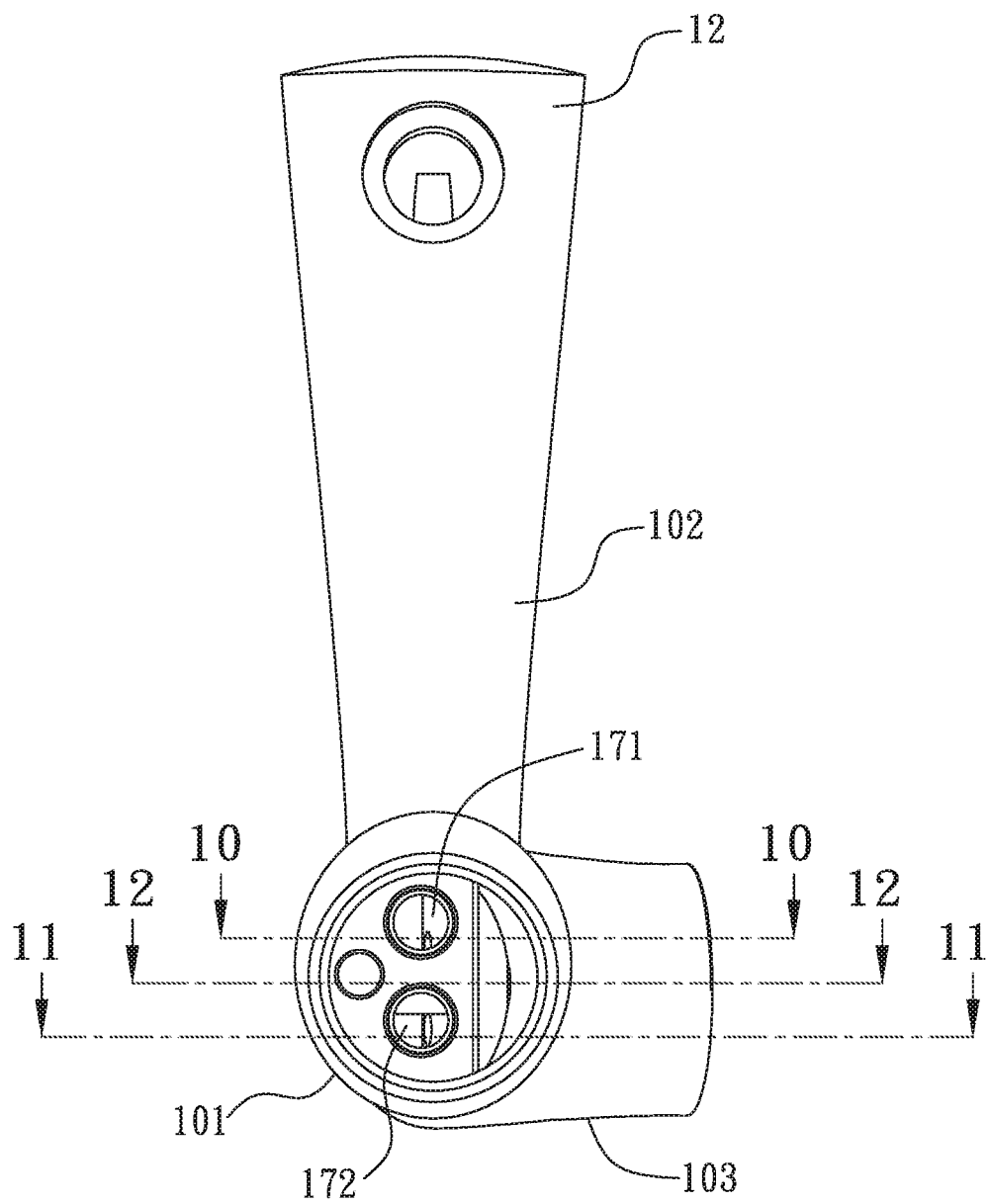
FIG. 30 is a side plane view showing the assembly of a part of the touch faucet according to the second embodiment of the present invention.
Figure 31:
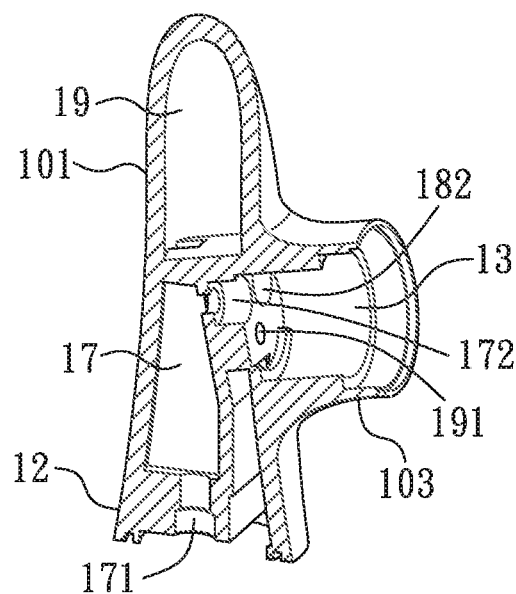
FIG. 31 is a cross-sectional perspective view taken along the line of 10-10 of FIG. 30.
Figure 32:
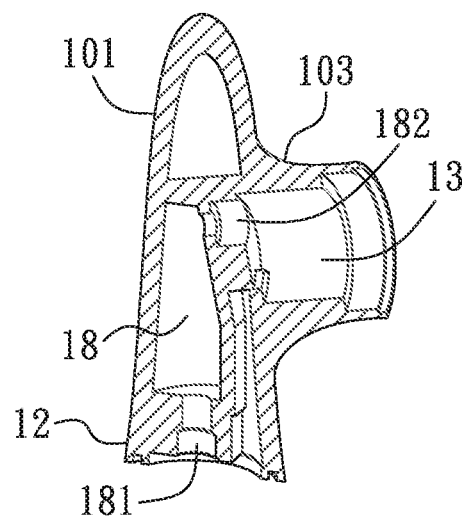
FIG. 32 is a cross-sectional perspective view taken along the line of 11-11 of FIG. 30.
Figure 33:
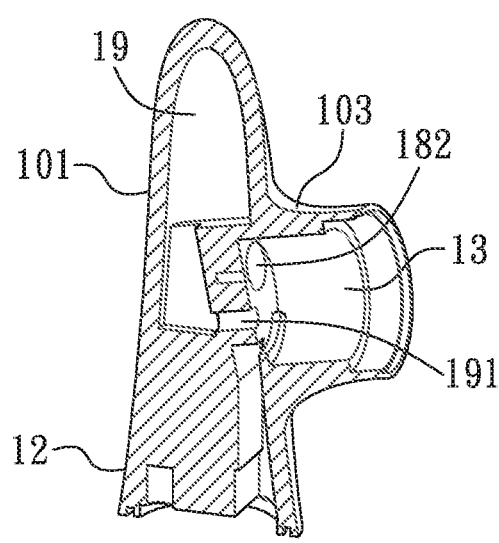
FIG. 33 is a cross-sectional perspective view taken along the line of 12-12 of FIG. 30.
Figure 34:
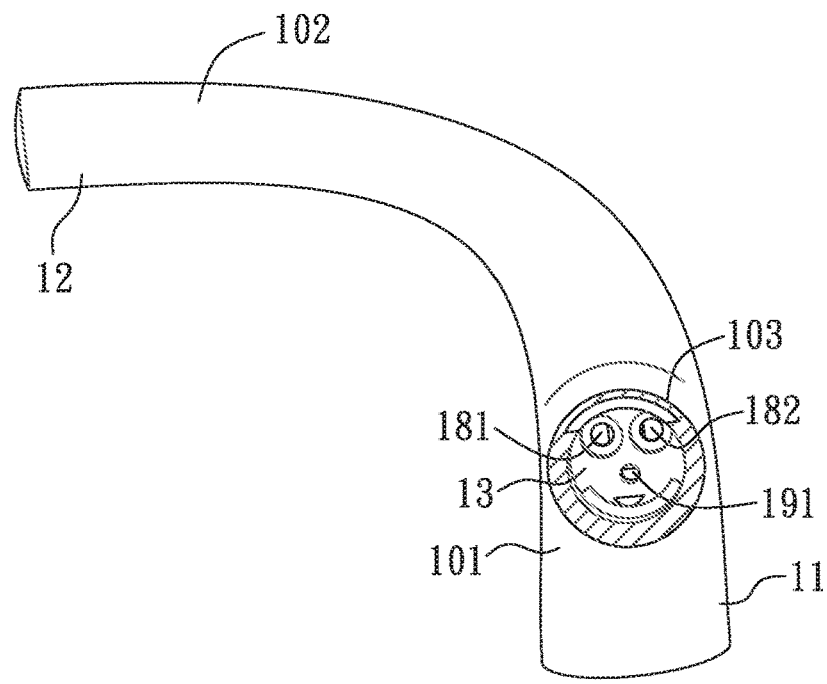
FIG. 34 is a cross-sectional perspective view showing the assembly of a part of the touch faucet according to the second embodiment of the present invention.

With reference to FIGS. 27 to 29, a touch faucet 3 according to a second embodiment of the present invention is mounted on a basin or a fixing wall 2 in a bathroom, and a difference of the touch faucet 3 from that of the first embodiment comprises a body 10 integrally formed, wherein the body 10 includes a columnar part 101 and a water outflow portion 102 extending outwardly from the columnar part 101; the columnar part 101 has the inlet segment 11 and the first cavity 13; the water outflow portion 102 has the outlet segment 12; and the columnar part 101 further has an affix pedestal 103 and the first cavity 13 defined in the affix pedestal 103.

Referring to FIGS. 30 to 34, between the inlet segment 11 and the first cavity 13 are defined a cold-water passageway 17 and a hot-water passageway 18; the cold-water passageway 17 has a cold-water inlet 171 formed on the inlet segment 11 so as to connect with a cold-water inflow pipe 61, and the hot-water passageway 18 has a hot-water inlet 181 arranged on the inlet segment 11 so as to connect with a hot-water inflow pipe 62; the cold-water passageway 17 has a first opening 172 formed on the first cavity 13 and has a second opening 182 formed on the first cavity 13, wherein the first opening 172 and the second opening 182 are in communication with the water inflow portion 21 of a temperature control valve 201 so that cold water from the first opening 172 and hot water from the second opening 182 flow into and mix in the mixing chamber 22 via the water inflow portion 21. Between the outlet segment 12 of the water outflow portion 102 and the first cavity 13 is defined a tunnel 19, and the tunnel 19 has a third opening 191 formed on the first cavity 13 and communicating with the water outflow portion 23 of the temperature control valve 201 so that the mixing water from the water outflow portion 23 is guided into the outlet segment 12.

Figure 35:
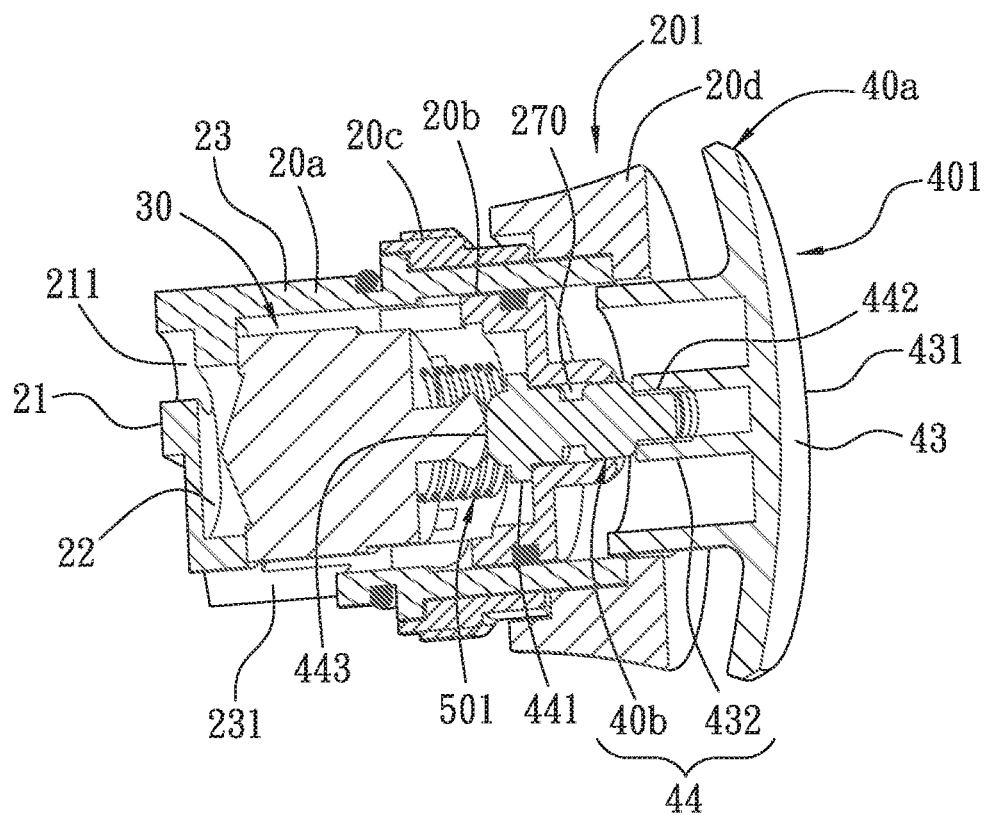
FIG. 35 is another cross-sectional perspective view showing the assembly of a part of the touch faucet according to the second embodiment of the present invention.
Figure 36:
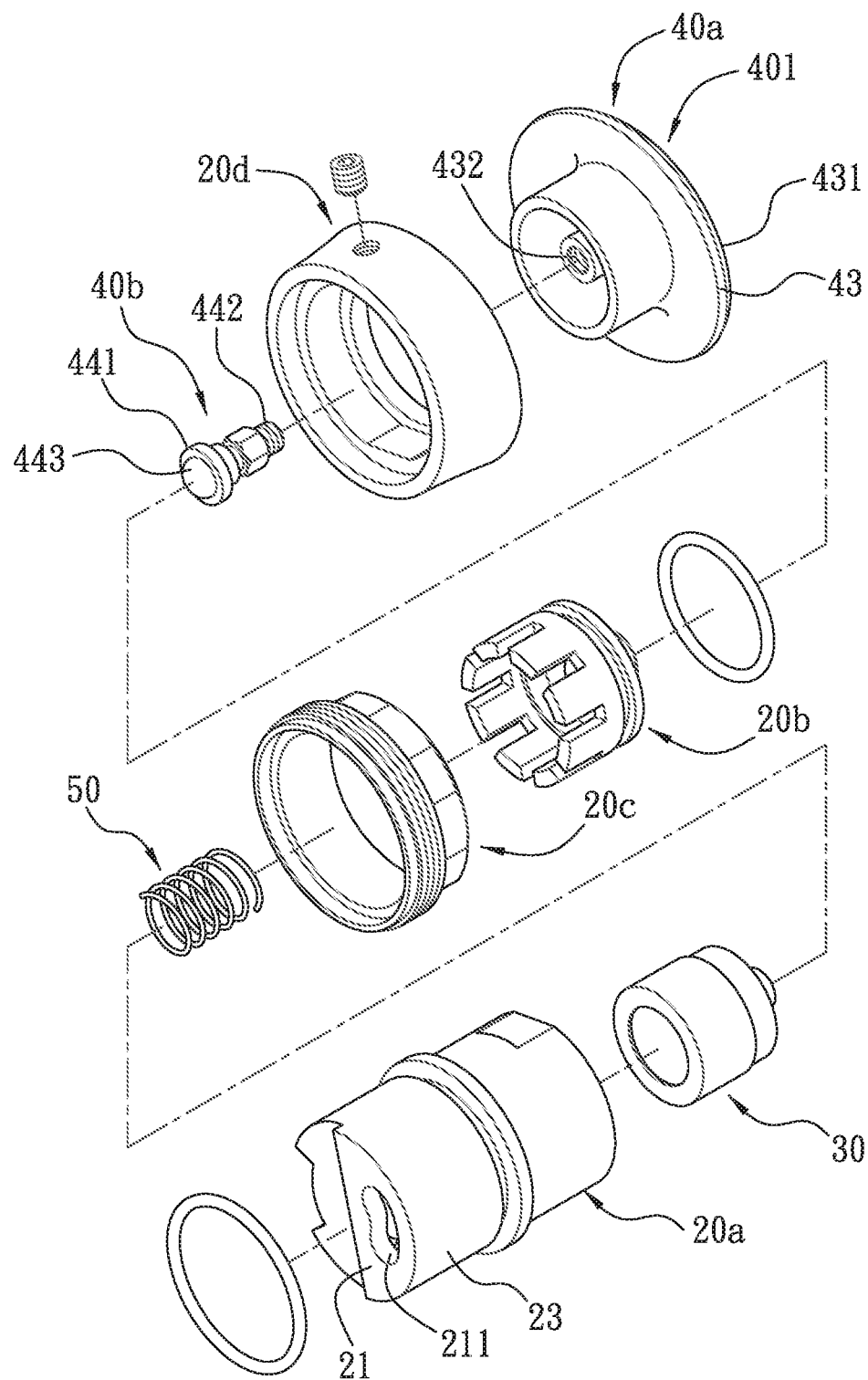
FIG. 36 is another perspective view showing the exploded components of a part of the touch faucet according to the second embodiment of the present invention.

As illustrated in FIGS. 35 and 36, the temperature control valve 201 further includes an adjustment column 20a, a cover 20b, a definition loop 20c, and an adjusting ring 20d.

The adjustment column 20a is rotatably fixed in the first cavity 13 of the columnar part 101 within a rotatable range and includes the water inflow portion 21, the mixing chamber 22, and the water outflow portion 23. The water inflow portion 21 has an intake 211, and as rotating the adjustment column 20a to adjust water flows of the intake 211, the first opening 172 and the second opening 182 of the columnar part 101, a mixing ratio and a mixing temperature of the cold water and the hot water in the mixing chamber 22 are adjustable.

The water outflow portion 23 has at least one flowing hole 231 defined around a peripheral side of the water control valve 30 and communicating with the third opening 191 via the first cavity 13.

The cover 20b is secured in the adjustment column 20a and has a ventilation 270 so that a part of an actuation member 401 inserts through the ventilation 270 to drive the operation post 31 of the water control valve 30.

The definition loop 20c is locked in the first cavity 13 of the columnar part 101 so that the adjustment column 20a is limited in the first cavity 13.

The adjusting ring 20d is fitted on the adjustment column 20a and is operated by the user so as to drive the adjustment column 20a to revolve.

The actuation member 401 has a forced portion 43 and a driving portion 44 extending into the water outflow portion 23 of the temperature control valve 201 from a bottom of the forced portion 43 via the ventilation 270 of the cover 20b so as to drive the driving portion 44 of the operation post 31. The driving portion 44 has a limitation block 441 limited and moving in the water outflow portion 23.

The actuation member 401 further has a button 40a and a drive shaft 40b; wherein the button 40a has a forced portion 43, a pressing face 431 defined on a top of the forced portion 43, and a coupling portion 432 extending from the forced portion 43. The drive shaft 40b has a joining segment 442 and a contacting segment 443, wherein the joining segment 442 is in connection with the coupling portion 432, and the contacting segment 443 contacts with the operation post 31 and is adjacent to the limitation block 441. The coupling portion 432 of the button 40a and the drive shaft 40b form the driving portion 44.

A returning device 501 is a resilient element defined between the drive shaft 40b of the actuation member 401 and the water control valve 30, and the resilient element is a compression spring, as shown in FIG. 25.

Figure 37:
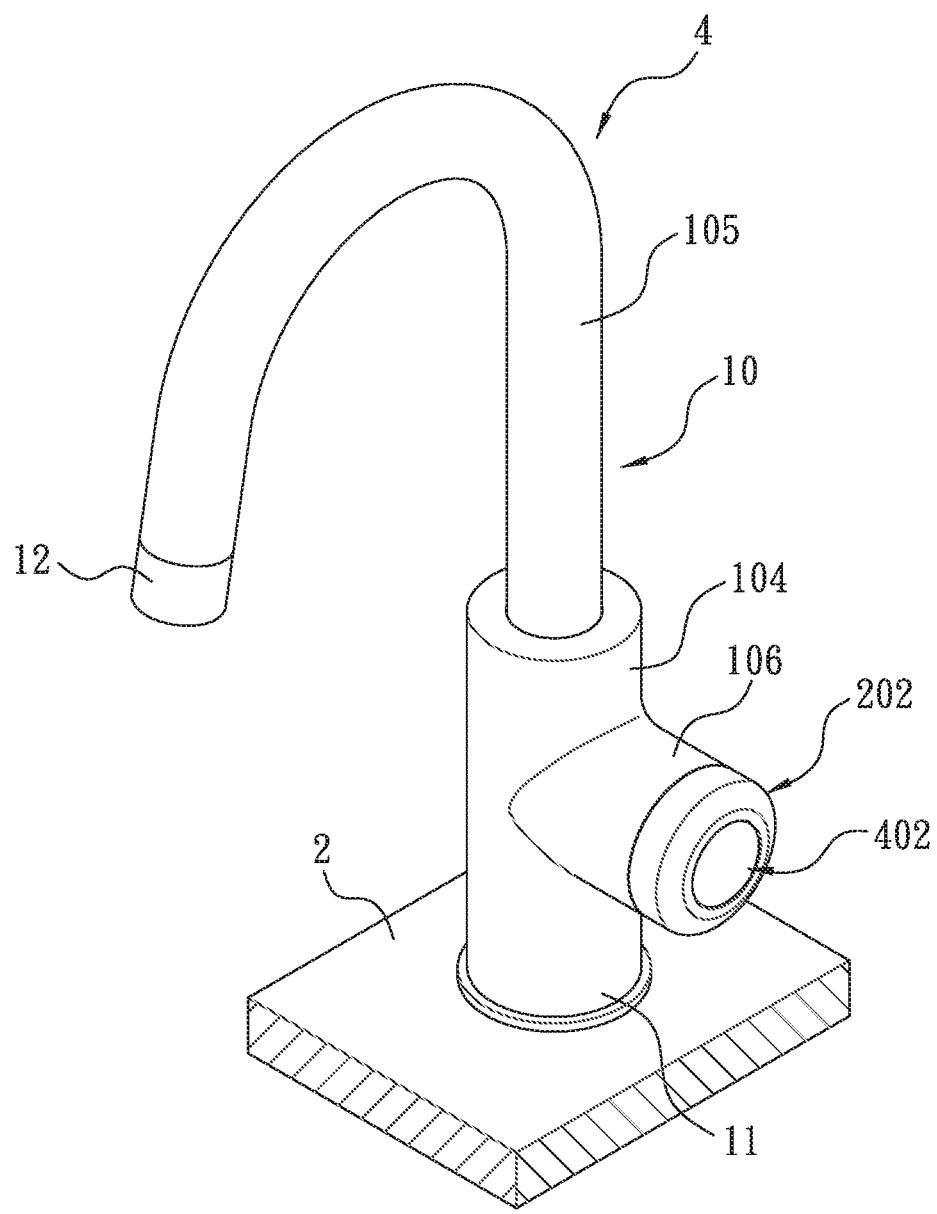
FIG. 37 is a perspective view showing the application of a touch faucet according to a third embodiment of the present invention.
Figure 38:
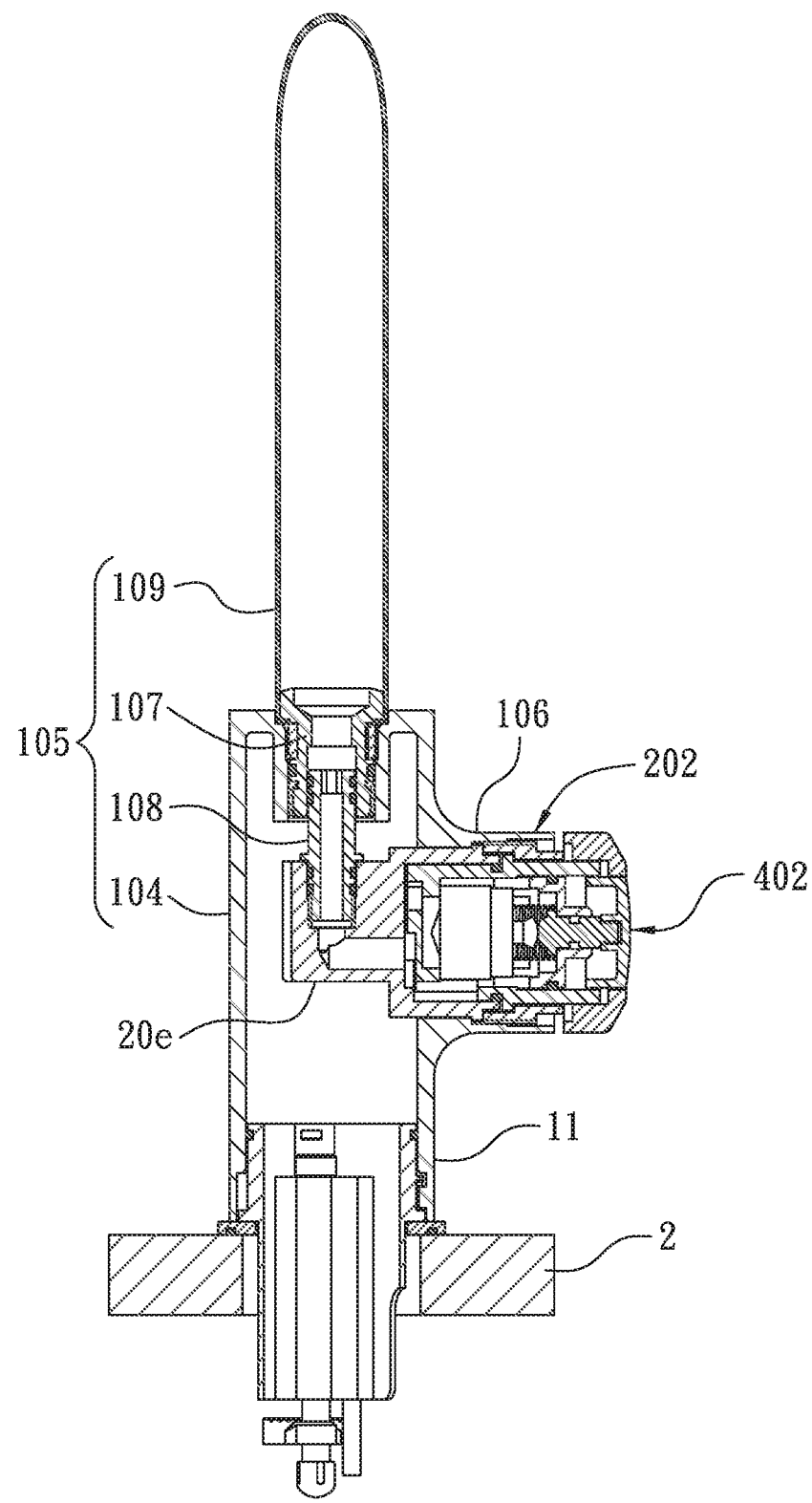
FIG. 38 is a cross sectional view showing the assembly of the touch faucet according to the third embodiment of the present invention.
Figure 39:
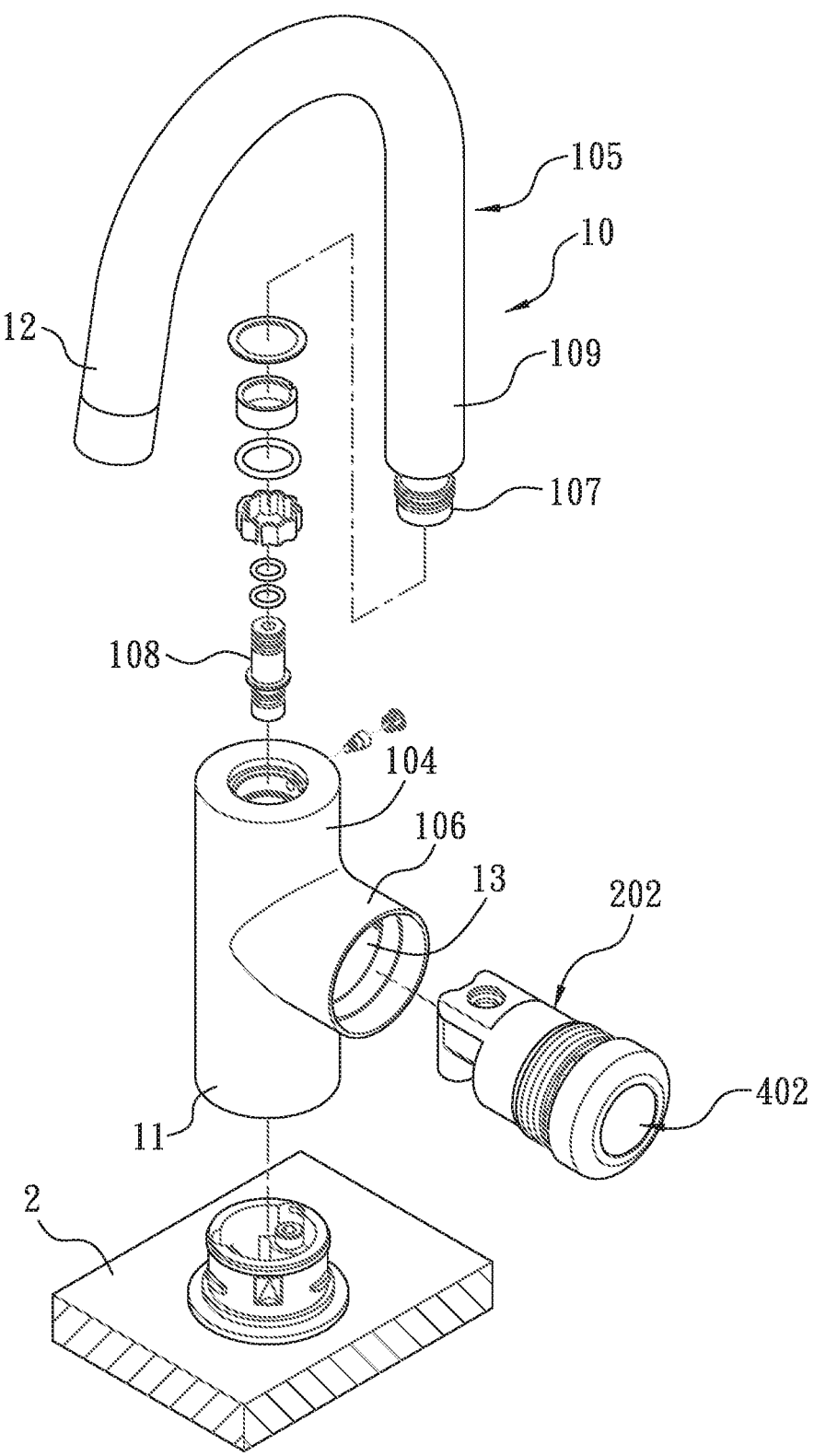
FIG. 39 is a perspective view showing the exploded components of a part of the touch faucet according to the third embodiment of the present invention.
Figure 40:
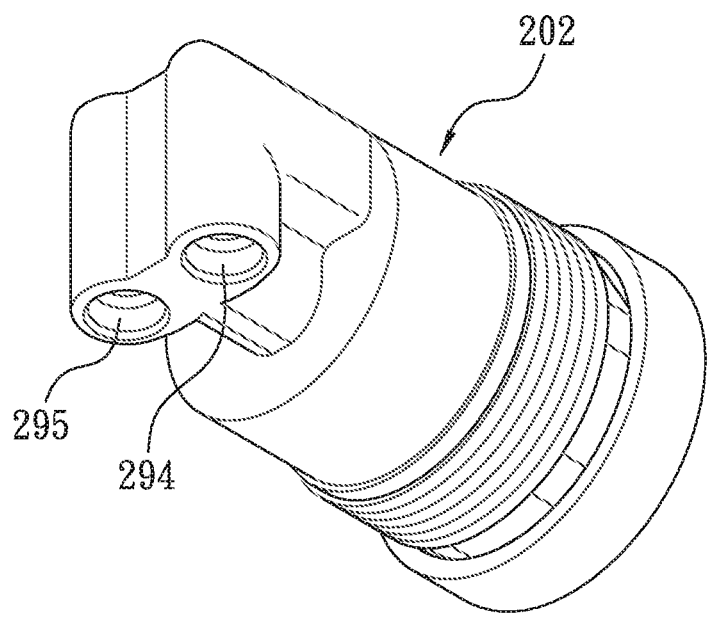
FIG. 40 is a perspective view showing the assembly of a part of the touch faucet according to the third embodiment of the present invention.
Figure 41:
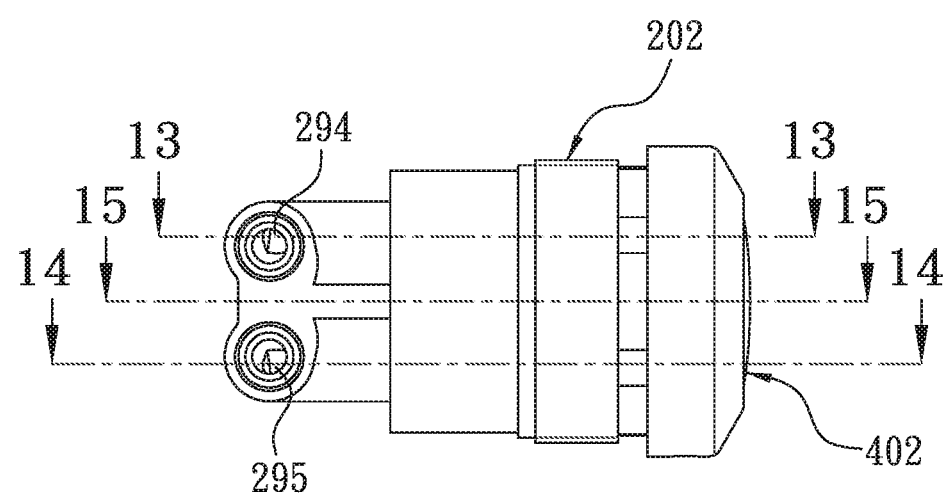
FIG. 41 is a side plane view showing the assembly of a part of the touch faucet according to the third embodiment of the present invention.
Figure 42:
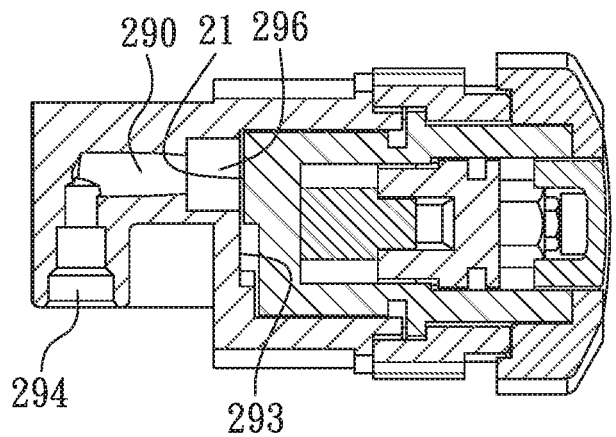
FIG. 42 is a cross sectional view taken along the line of 13-13 of FIG. 41.
Figure 43:
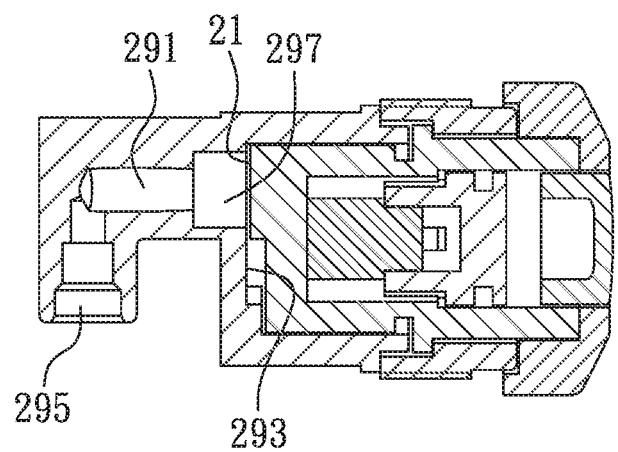
FIG. 43 is a cross sectional view taken along the line of 14-14 of FIG. 41.
Figure 44:
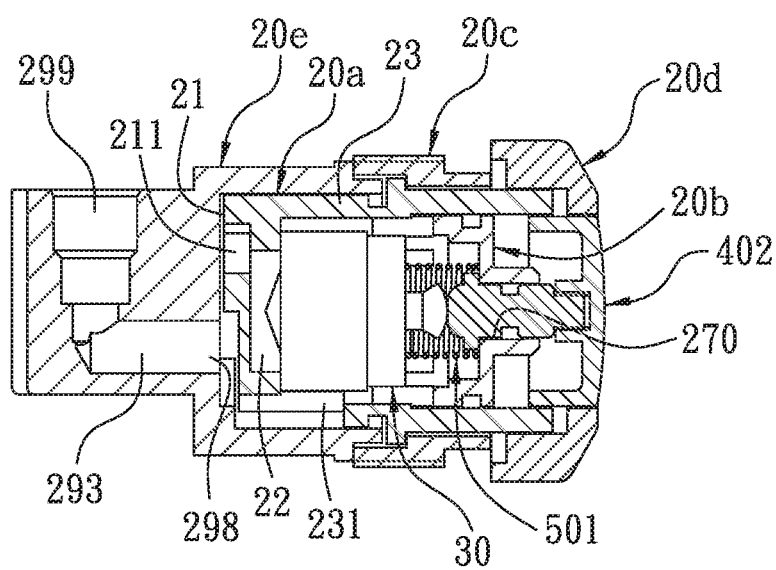
FIG. 44 is a cross sectional view taken along the line of 15-15 of FIG. 41.
Figure 45:
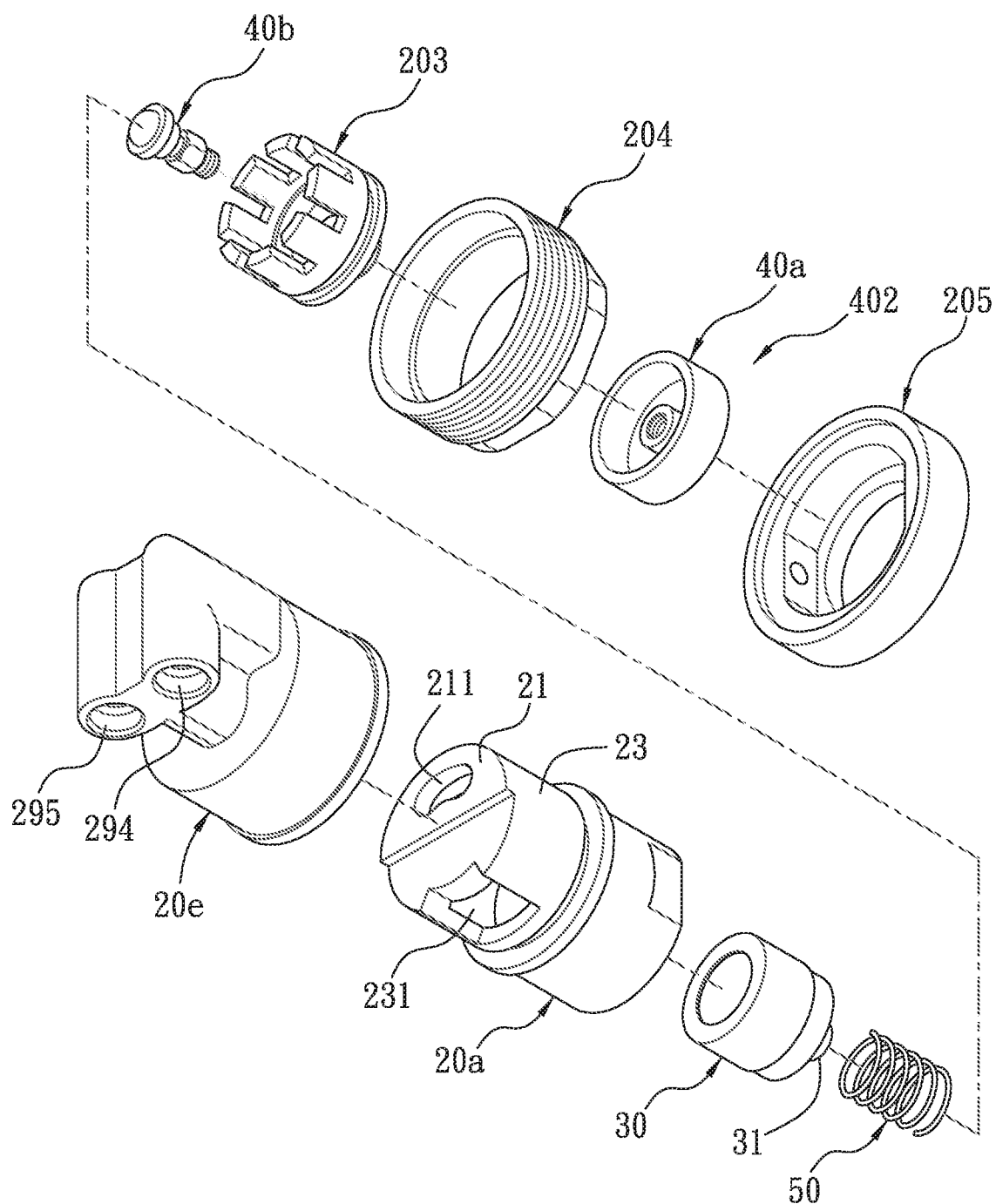
FIG. 45 is another perspective view showing the exploded components of a part of the touch faucet according to the third embodiment of the present invention.
Figure 46:
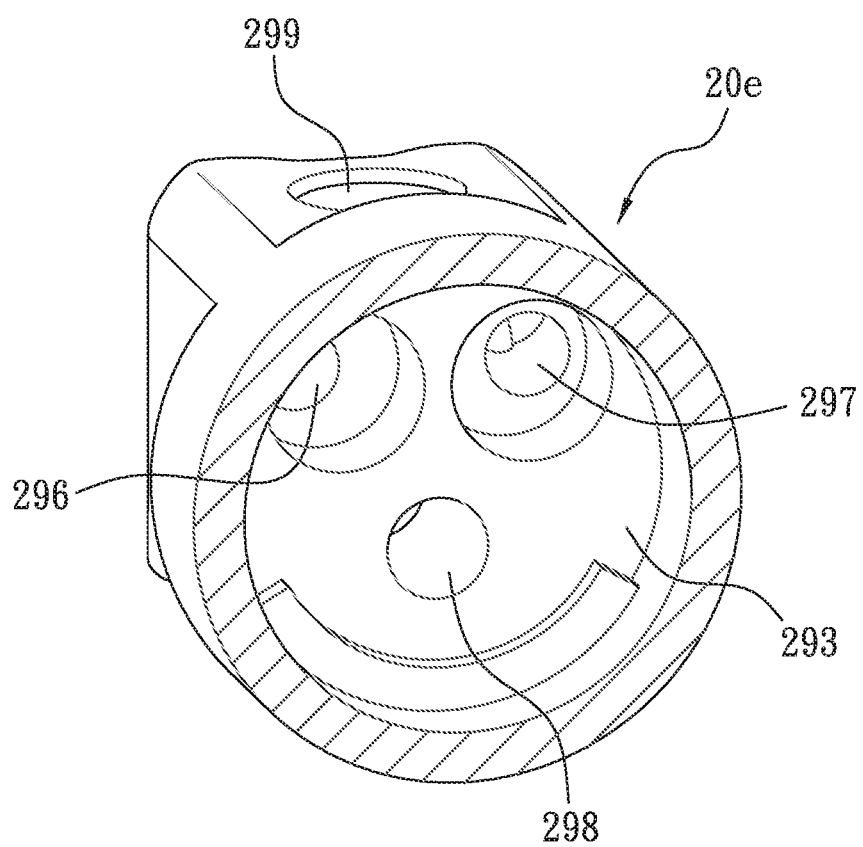
FIG. 46 is a cross-sectional perspective view showing the assembly of a part of the touch faucet according to the third embodiment of the present invention.

With reference to FIGS. 37 to 39, a touch faucet 4 according to a third embodiment of the present invention is mounted on a fixing wall 2 of a countertop in a kitchen, and a difference of the touch faucet 4 from that of the second embodiment comprises a body 10, wherein the body 10 includes a cylinder 104 and a water supply assembly 105, wherein the cylinder 104 has the inlet segment 11 and the first cavity 13; the water supply assembly 105 has the outlet segment 12 communicating with the water outflow portion 23 of the temperature control valve 20 via the cylinder 104, such that the mixing water flows into the outlet segment 12 from the water outflow portion 23; the cylinder 104 further has an affix pedestal 106 and the first cavity 13 defined in the affix pedestal 106.

The water supply assembly 105 further includes a connector 107 fixed on one end of the cylinder 104 opposite to the inlet segment 11; a connection tube 108 fitted between the connector 107 and a temperature control valve 202; a second outlet tube 109 fitted on the connector 107 and having the outlet segment 12.

Referring to FIGS. 40 to 46, the temperature control valve 202 further includes a valve seat 20e, an adjustment column 20a, a cover 20b, a definition loop 20c, and an adjusting ring 20d; wherein the adjustment column 20a, the cover 20b, the definition loop 20c, and the adjusting ring 20d are identical to those of the second embodiment.

The valve seat 20e is accommodated in the first cavity 13 of the cylinder 104 and includes a first conduit 290 configured to flow the cold water, a second conduit 291 configured to flow the hot water, a flowing channel 292 configured to flow a mixing water of the cold water and the hot water, and a housing trench 293. The first conduit 290 has a cold-water inlet 294 formed on a first end thereof so as to connect with a cold-water inflow pipe 61, and the second conduit 291 has a hot-water inlet 295 arranged on a first end thereof so as to connect with a hot-water inflow pipe 62. The first conduit 290 has a first opening 296 formed on a second end thereof in the housing trench 293, and the second conduit 291 has a second opening 297 formed on a second end thereof in the housing trench 293; the flowing channel 292 has a third opening 298 formed on a first end thereof in the housing trench 293; the flowing channel 292 has a notch 299 defined on a second end thereof so as to connect with the connection tube 108 of the water supply assembly 105. The cold-water inlet 294 and the hot-water inlet 295 are located at the same side, and the notch 299 is opposite to the cold-water inlet 294 and the hot-water inlet 295.

Thereby, the adjustment column 20a is rotated within a rotatable range and is fixed in the housing trench 293. In addition, the definition loop 20c is locked in the first cavity 13, and the valve seat 20e and the adjustment column 20a are accommodated in the first cavity 13.

The touch faucet 4 further comprises an actuation member 402 identical to the actuation member 401 of the second embodiment, and the touch faucet 4 further comprises a returning device 50 identical to that of the second embodiment, so further remarks are omitted.

Figure 47:
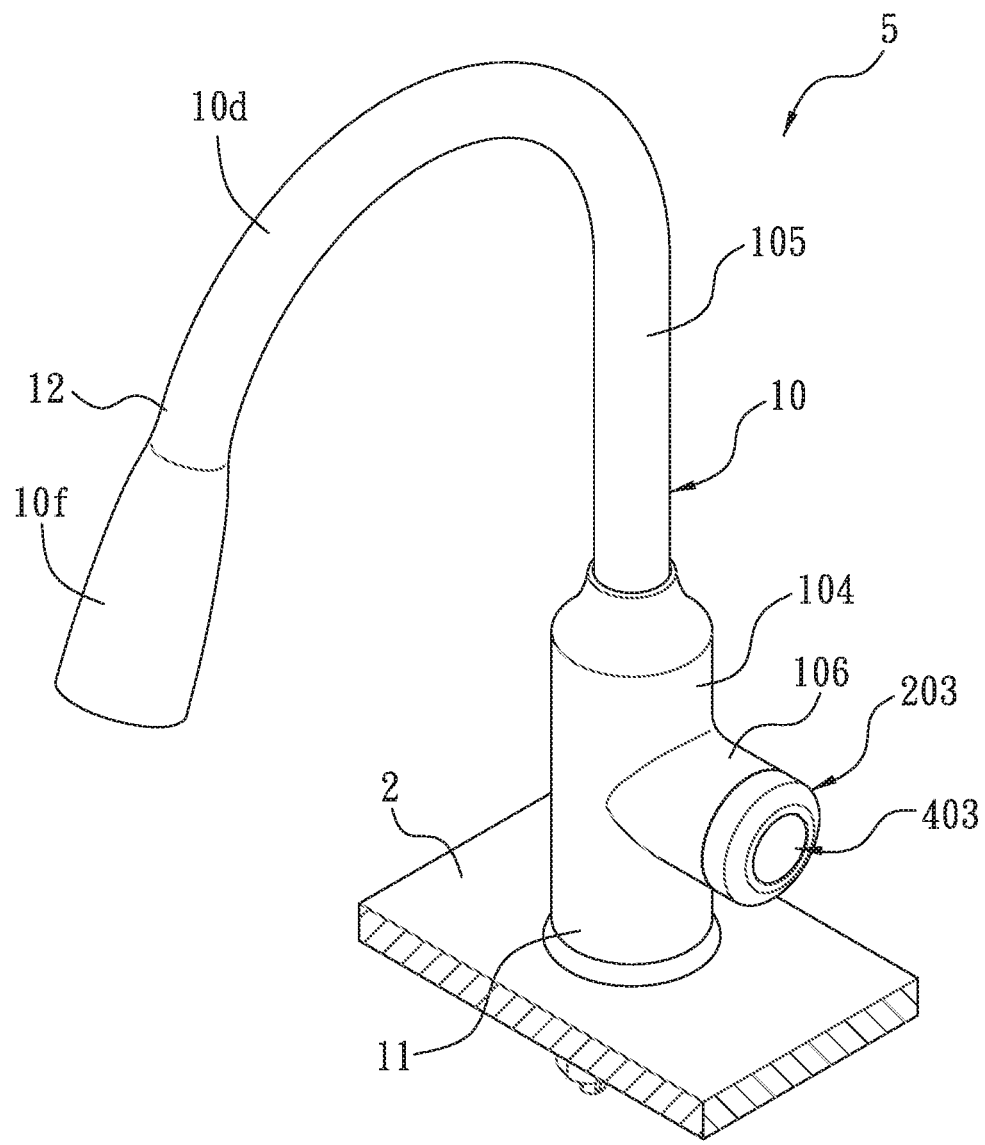
FIG. 47 is a perspective view showing the application of a touch faucet according to a fourth embodiment of the present invention.
Figure 48:
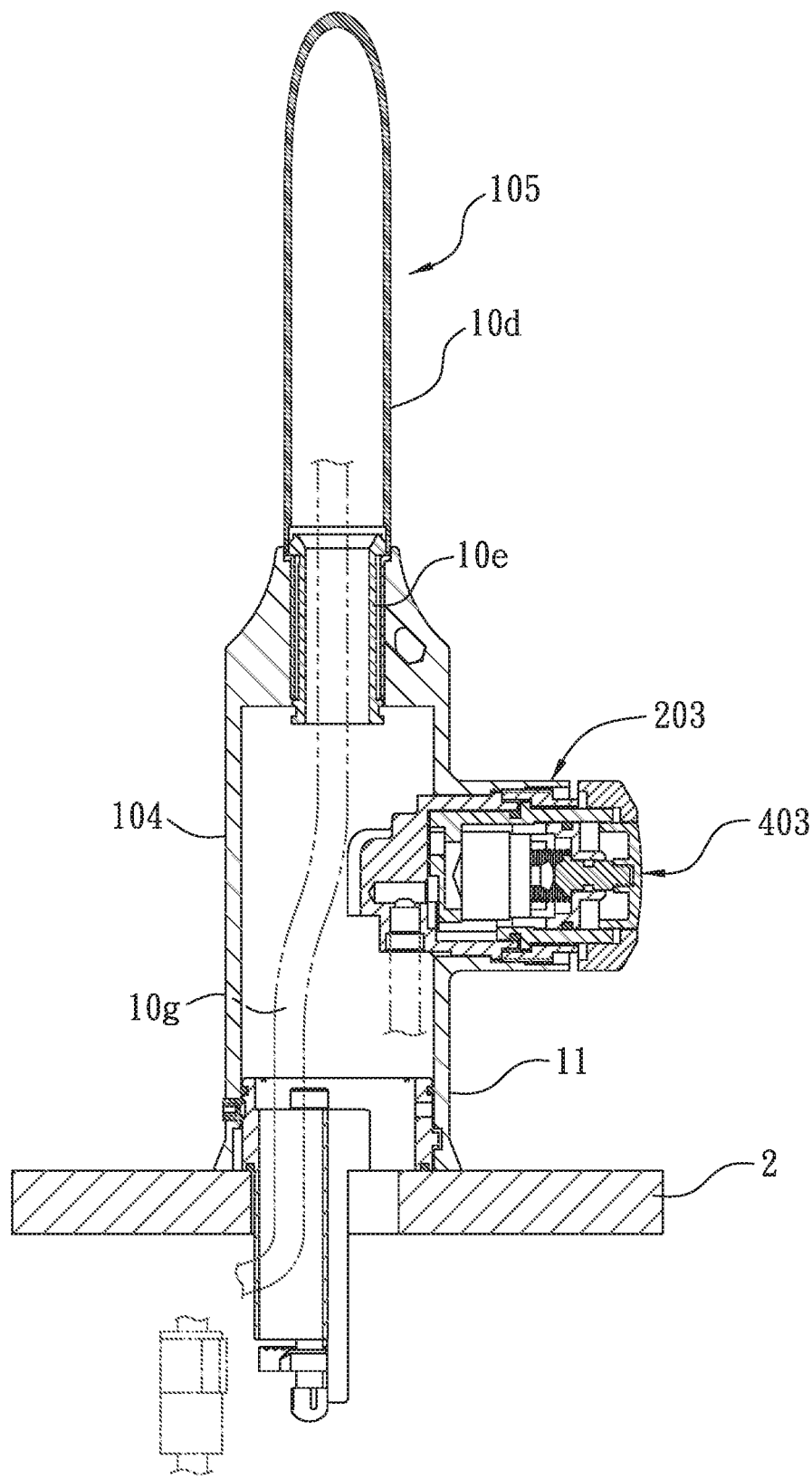
FIG. 48 is a cross sectional view showing the assembly of the touch faucet according to the fourth embodiment of the present invention.
Figure 49:
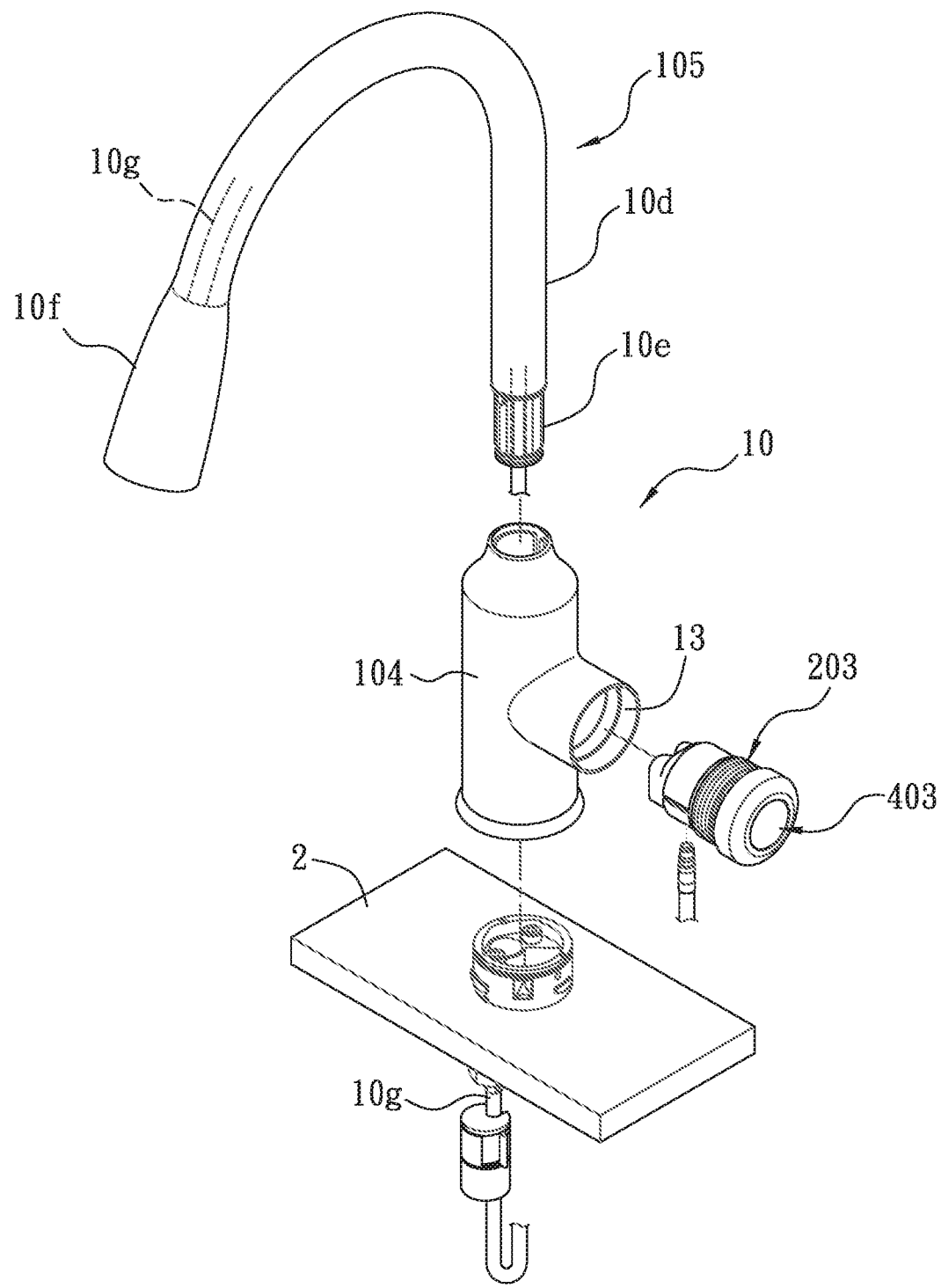
FIG. 49 is a perspective view showing the exploded components of a part of the touch faucet according to the fourth embodiment of the present invention.
Figure 50:
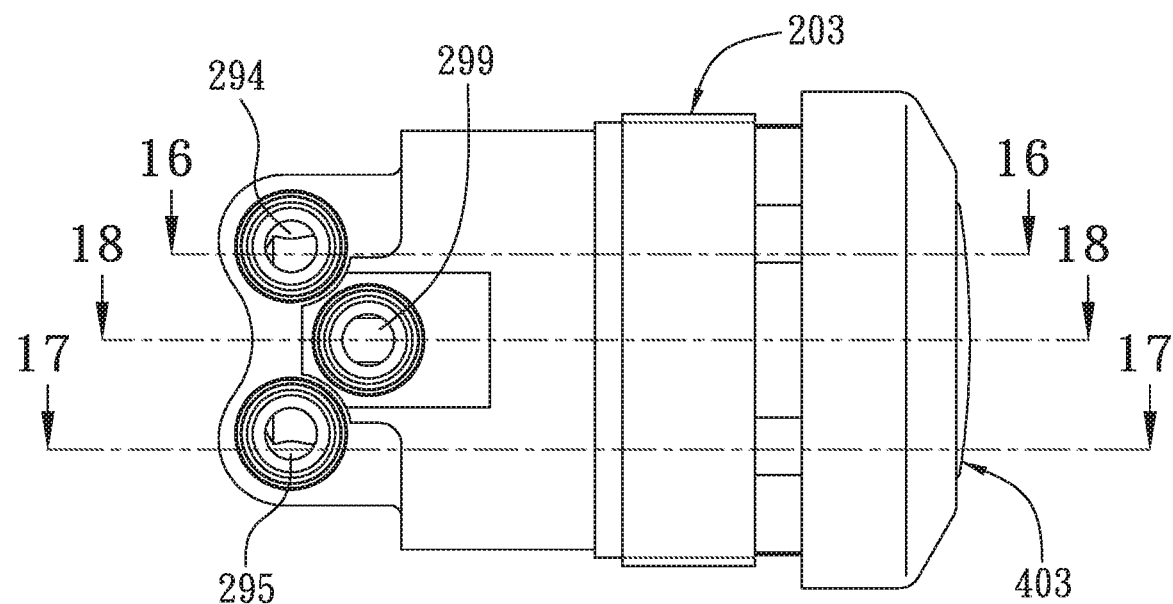
FIG. 50 is a side plane view showing the assembly of a part of the touch faucet according to the fourth embodiment of the present invention.
Figure 51:
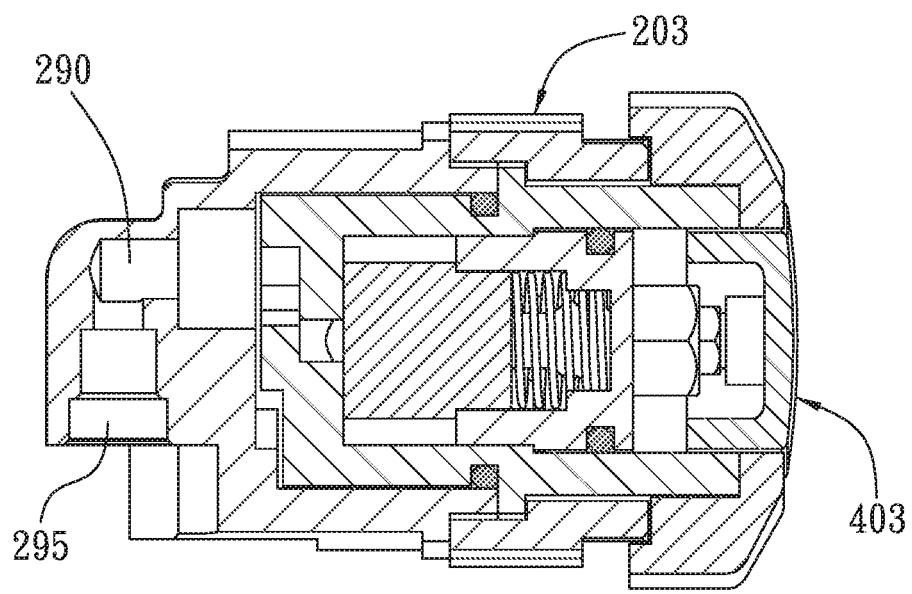
FIG. 51 is a cross sectional view taken along the line of 16-16 of FIG. 50.
Figure 52:
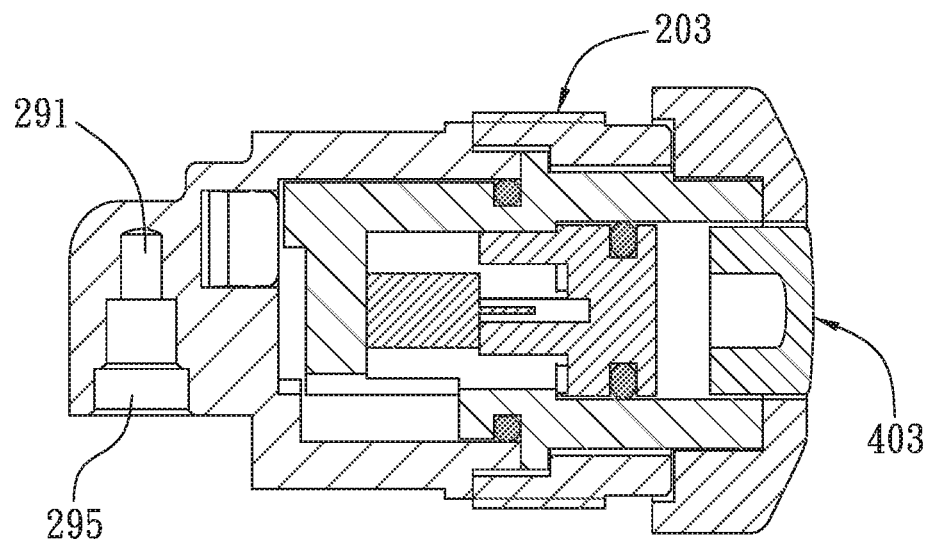
FIG. 52 is a cross sectional view taken along the line of 17-17 of FIG. 50.
Figure 53:
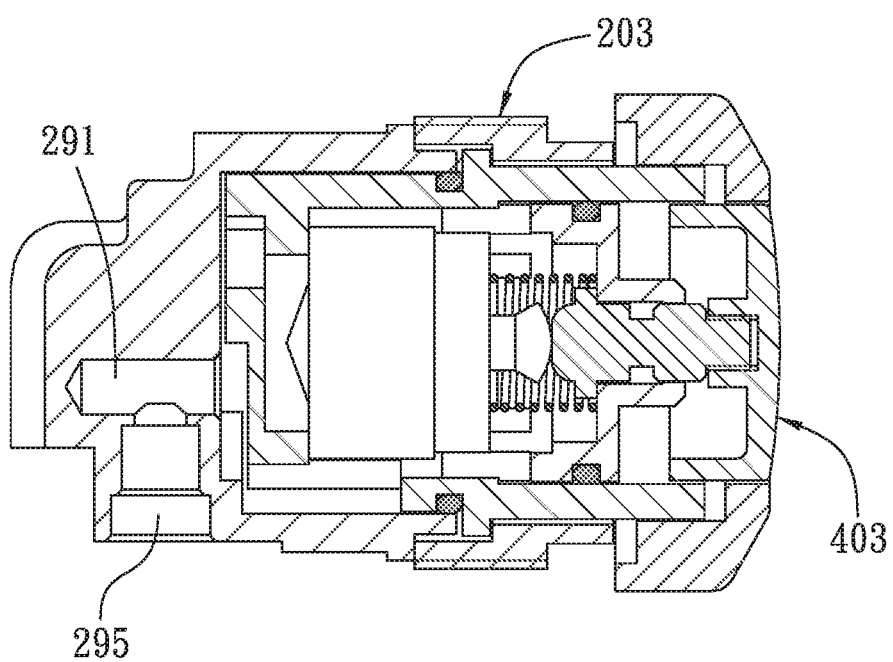
FIG. 53 is a cross sectional view taken along the line of 18-18 of FIG. 50.
Figure 54:
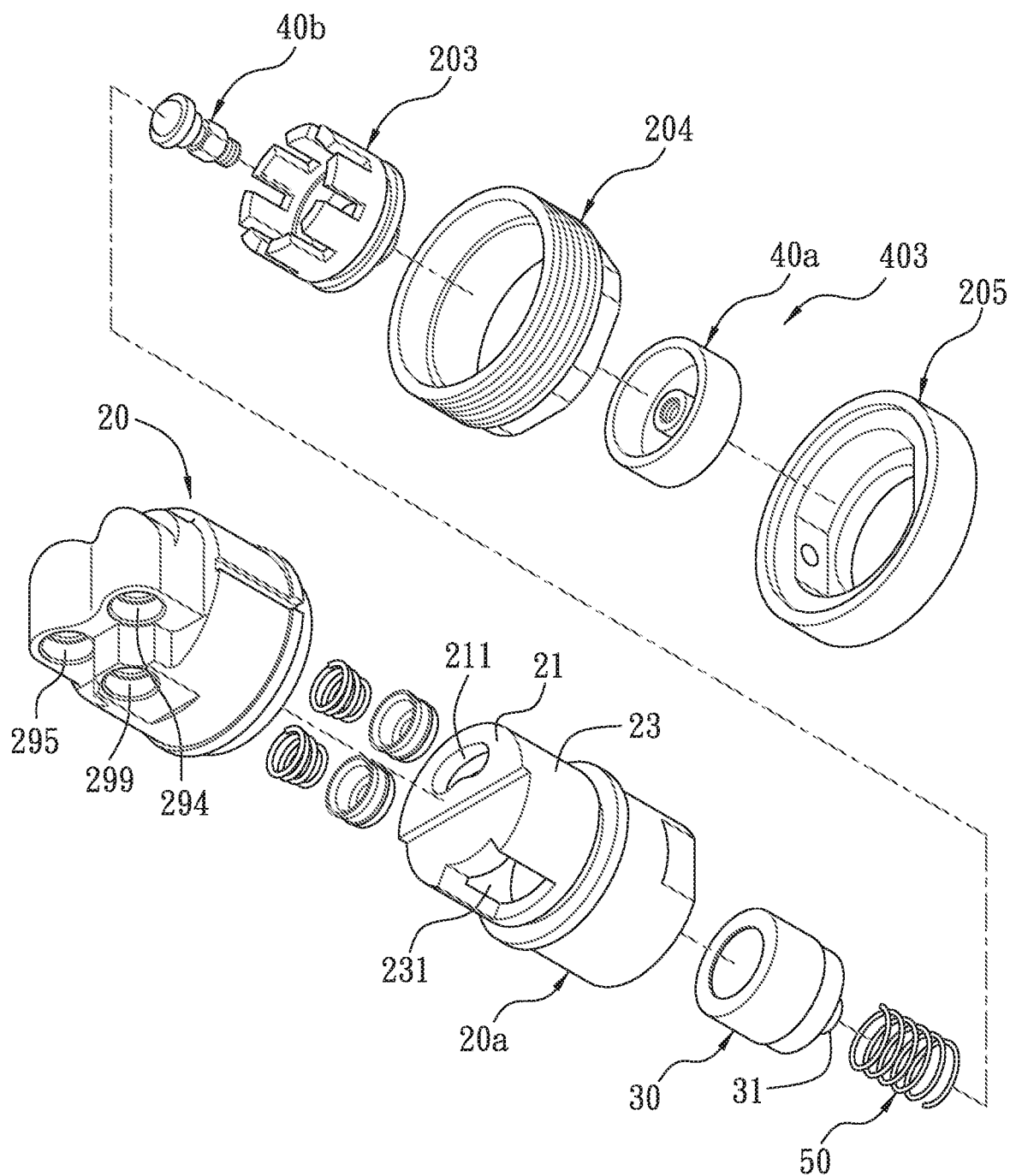
FIG. 54 is another perspective view showing the exploded components of a part of the touch faucet according to the fourth embodiment of the present invention.

Referring to FIGS. 47 to 49, a touch faucet 5 according to a fourth embodiment of the present invention is a pull-out faucet and is mounted on a fixing wall 2 of a countertop in a kitchen, a difference of the touch faucet 5 from that of the third embodiment comprises a water supply assembly 105, and the water supply assembly 105 further includes a second outlet tube 10d on which the outlet segment 12 forms; a hollow pillar 10e arranged on one end of the cylinder 104 opposite to the inlet segment 11 and fitted with the second outlet tube 10d; a spray head 10f movably secured on the outlet segment 12 of the second outlet tube 10d; a hose 10g having an inflow end which is coupled with the notch 299 of a temperature control valve 203, and the house 10g also having an outflow end which is joined with the spray head 10f, such that the hose 10g is pulled outwardly with the spray head 10f, and the mixing water sprays out of the spray head 10f from the temperature control valve 203.

The touch faucet 5 further comprises an actuation member 403 identical to the actuation member 402 of the third embodiment, and the touch faucet 5 further comprises a returning device 50 identical to that of the third embodiment, so further remarks are omitted.

Accordingly, the water control valve 30 is capable of saving and stopping the water supply automatically. For example, when the operation post 31 is driven to move, the water supply of the touch faucet is started for a period of time, and after the operation post 31 automatically moves back to the original position, the water supply is stopped.

When the water control valve 30 cannot stop the water supply, the actuation members 40, 401, 402, 403 are pressed so that the water control valve 30 stops the water supply.

Preferably, the actuation members 40, 401, 402, 403 cooperate with the returning device 50 so as to return back to the original positions automatically.

The actuation members 40, 401, 402, 403 are pressed to drive the operation post 31 of the water control valve 30 to stop the water supply easily.

The actuation members 40, 401, 402, 403 drive the water control valve 30 so as to avoid the water control valve 30 being touched by user's hand, thus preventing contamination of the water control valve 30.

The touch faucets 1, 3, 4, 5 are a pull-out faucet or a non pull-out faucet fixed in the bathroom or the kitchen so as to satisfy using requirements.

The touch faucets 1, 3, 4, 5 are capable of saving the water supply and adjusting water temperature by way of the water control valve 30 and the temperature control valves 20, 201, 202, 203.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A touch faucet comprising:
    a body including an inlet segment, an outlet segment, and a first cavity defined between the inlet segment and the outlet segment; the first cavity having a first hole;
    a temperature control valve housed in the first cavity of the body, and the temperature control valve including a water inflow portion configured to flow cold water and hot water, a mixing chamber in which the cold water and the hot water are mixed together at a predetermined ratio so as to form a mixing water, and a water outflow portion configured to flow the mix water; the water outflow portion being in communication with the outlet segment of the body so that the mixing water flows out of the outlet segment;
    a water control valve fixed between the mixing chamber and the water outflow portion of the temperature control valve, and the water control valve including an operation post extending outwardly therefrom and touched to turn on the water control valve, such that the mixing water flows into the water outflow portion from the mixing chamber; and
    an actuation member partially exposing outside the body so as to be operated by a user to drive the operation post of the water control valve to move,
    wherein the temperature control valve further includes:
    a valve seat accommodated in the first cavity of the cylinder, and the valve seat including a first conduit configured to flow the cold water, a second conduit configured to flow the hot water, a flowing channel configured to flow the mixing water of the cold water and the hot water, and a housing trench; wherein the first conduit has a cold-water inlet formed on a first end thereof so as to connect with a cold-water inflow pipe, and the second conduit has a hot-water inlet arranged on a first end thereof so as to connect with a hot-water inflow pipe; the first conduit has a first opening formed on a second end thereof in the housing trench, and the second conduit has a second opening formed on a second end thereof in the housing trench; the flowing channel has a third opening formed on a first end thereof in the housing trench; and the flowing channel has a notch defined on a second end thereof so as to connect with the inflow end of the hose; the cold-water inlet, the hot-water inlet, and the notch are located at the same side;
    an adjustment column fixed in the first cavity of the columnar part within a rotatable range, and the adjustment column including the water inflow portion, the mixing chamber, and the water outflow portion; the water inflow portion having an intake, and as rotating the adjustment column to adjust water flows of the intake, the first opening and the second opening of the columnar part, a mixing ratio and a mixing temperature of the cold water and the hot water in the mixing chamber are adjustable; the water outflow portion having at least one flowing hole defined around a peripheral side of the water control valve and communicating with the third opening via the first cavity;
    a cover secured in the adjustment column and having a ventilation so that a part of the actuation member inserts through the ventilation to drive the operation post of the water control valve;
    a definition loop locked in the first cavity of the columnar part so that the valve seat and the adjustment column are accommodated in the first cavity; and
    an adjusting ring fitted on the adjustment column and operated by the user so as to drive the adjustment column to revolve.

2. The touch faucet as claimed in claim 1, wherein the actuation member includes a forced portion, and the actuation member includes a driving portion extending from the forced portion and inserted into the water outflow portion of the temperature control valve, wherein the actuation member is pressed to drive the driving portion to actuate, and the operation post of the water control valve is actuated by the driving portion to move.

3. The touch faucet as claimed in claim 2 further comprising a returning device configured to return the actuation member back to an original position, after not pressing the actuation member.

4. The touch faucet as claimed in claim 3, wherein the returning device is a resilient element which is defined between the actuation member and the water outflow portion, and the resilient element is a disc spring or a compression spring.

5. The touch faucet as claimed in claim 3, wherein the returning device includes a first magnetic attraction element and a second magnetic attraction element which are defined between the actuation member and the water outflow portion, such that when the actuation member is pressed to move, the first magnetic attraction element and the second magnetic attraction element move to each other so as to produce magnetic repulsion.

6. The touch faucet as claimed in claim 1, wherein the water control valve is turned off by the operation post after being turned on.

7. The touch faucet as claimed in claim 1, wherein the water control valve is turned off automatically after being turned on for a period of using time.

* * * * *